US011783810B2

(12) United States Patent
Dame et al.

(10) Patent No.: US 11,783,810 B2
(45) Date of Patent: Oct. 10, 2023

(54) VOICE ACTIVITY DETECTION AND DIALOGUE RECOGNITION FOR AIR TRAFFIC CONTROL

(71) Applicant: The Boeing Company, Chicago, IL (US)

(72) Inventors: Stephen Dame, Everett, WA (US); Yu Qiao, Shoreline, WA (US); Taylor A. Riccetti, Bothell, WA (US); David J. Ross, Issaquah, WA (US); Joshua Welshmeyer, Kirkland, WA (US); Matthew Sheridan-Smith, Kirkland, WA (US); Su Ying Li, Kirkland, WA (US); Zarrin Khiang-Huey Chua, Cambridge, MA (US); Jose A. Medina, Bothell, WA (US); Michelle D. Warren, Seattle, WA (US); Simran Pabla, Everett, WA (US); Jasper P. Corleis, Renton, WA (US)

(73) Assignee: The Boeing Company, Chicago, IL (US)

( * ) Notice: Subject to any disclaimer, the term of this patent is extended or adjusted under 35 U.S.C. 154(b) by 95 days.

(21) Appl. No.: 16/932,291

(22) Filed: Jul. 17, 2020

(65) Prior Publication Data
US 2021/0020168 A1 Jan. 21, 2021

Related U.S. Application Data

(60) Provisional application No. 62/876,189, filed on Jul. 19, 2019.

(51) Int. Cl.
*G10L 15/16* (2006.01)
*G10L 25/21* (2013.01)
(Continued)

(52) U.S. Cl.
CPC .............. *G10L 15/16* (2013.01); *G06F 3/165* (2013.01); *G06N 5/04* (2013.01); *G06N 20/00* (2019.01);
(Continued)

(58) Field of Classification Search
CPC ....... G10L 15/16; G10L 15/04; G10L 15/063; G10L 15/22; G10L 25/21; G10L 25/51;
(Continued)

(56) References Cited

U.S. PATENT DOCUMENTS

| 8,214,205 B2 * | 7/2012 | Jang | G10L 21/0208 704/226 |
| 2005/0071156 A1 * | 3/2005 | Xu | G10L 21/0208 704/226 |

(Continued)

OTHER PUBLICATIONS

V. Stahl, A. Fischer and R. Bippus, "Quantile based noise estimation for spectral subtraction and Wiener filtering," 2000 IEEE International Conference on Acoustics, Speech, and Signal Processing. Proceedings (Cat. No. 00CH37100), 2000, pp. 1875-1878 vol. 3, doi: 10.1109/ICASSP.2000.862122. (Year: 2000).*

(Continued)

*Primary Examiner* — Bhavesh M Mehta
*Assistant Examiner* — Nandini Subramani
(74) *Attorney, Agent, or Firm* — Yee & Associates, P.C.

(57) ABSTRACT

Illustrative embodiments provide a method and system for communicating air traffic control information. An audio signal comprising voice activity is received. Air traffic control information in the voice activity is identified using an artificial intelligence algorithm. A text transcript of the air traffic control information is generated and displayed on a confirmation display. Voice activity in the audio signal may be detected by identifying portions of the audio signal that comprise speech based on a comparison between the power spectrum of the audio signal and the power spectrum of (Continued)

noise and forming speech segments comprising the portions of the audio signal that comprise speech.

20 Claims, 26 Drawing Sheets

(51) Int. Cl.
| | |
|---|---|
| G10L 25/51 | (2013.01) |
| G10L 25/84 | (2013.01) |
| G10L 15/22 | (2006.01) |
| G06F 3/16 | (2006.01) |
| G10L 15/06 | (2013.01) |
| G08G 5/00 | (2006.01) |
| G06N 20/00 | (2019.01) |
| G06N 5/04 | (2023.01) |
| G10L 15/04 | (2013.01) |

(52) U.S. Cl.
CPC .......... *G08G 5/0013* (2013.01); *G10L 15/04* (2013.01); *G10L 15/063* (2013.01); *G10L 15/22* (2013.01); *G10L 25/21* (2013.01); *G10L 25/51* (2013.01); *G10L 25/84* (2013.01); *G08G 5/003* (2013.01)

(58) Field of Classification Search
CPC ......... G10L 25/84; G10L 25/18; G10L 15/26; G06F 3/165; G06N 5/04; G06N 20/00; G06N 3/0454; G06N 3/08; G08G 5/0013; G08G 5/003; G08G 5/0026
See application file for complete search history.

(56) References Cited

U.S. PATENT DOCUMENTS

| | | | | |
|---|---|---|---|---|
| 2012/0253813 | A1* | 10/2012 | Katagiri ............... | G10L 25/78 704/254 |
| 2015/0073790 | A1* | 3/2015 | Steuble ................ | G10L 15/26 704/235 |
| 2018/0350351 | A1* | 12/2018 | Kopys .................. | G10L 15/02 |

OTHER PUBLICATIONS

Liang Hong, J. Rosea and R. Balan, "Independent component analysis based single channel speech enhancement," Proceedings of the 3rd IEEE International Symposium on Signal Processing and Information Technology (IEEE Cat. No. 03EX795), 2003, pp. 522-525, doi: 10.1109/ISSPIT.2003.1341173. (Year: 2003).*

V. Stahl, A. Fischer and R. Bippus, "Quantile based noise estimation for spectral subtraction and Wiener filtering," 2000 IEEE International Conference on Acoustics, Speech, and Signal Processing. Proceedings (Cat. No. 00CH37100), 2000, pp. 1875-1878 vol. 3. (included with prev 892) (Year: 2000).*

Neffe, M., Pham, T. V., Hering, H., & Kubin, G. (2007). Speaker segmentation for air traffic control. In Speaker Classification II (pp. 177-191). Springer, Berlin, Heidelberg (Year: 2007).*

Liang Hong, J. Rosea and R. Balan, "Independent component analysis based single channel speech enhancement," Proceedings of the 3rd IEEE International Symposium on Signal Processing and Information Technology (IEEE Cat. No. 03EX795), 2003, pp. 522-552 (Year: 2003).*

Šmídl, Luboš, et al. "Semi-supervised training of DNN-based acoustic model for ATC speech recognition." International Conference on Speech and Computer. Springer, Cham, 2018 (Year: 2018).*

V. Stahl, A. Fischer and R. Bippus, "Quantile based noise estimation for spectral subtraction and Wiener filtering," 2000 IEEE International Conference on Acoustics, Speech, and Signal Processing. Proceedings (Cat. No. 00CH37100), 2000 (Year: 2000).*

R.-S. Marinescu and C. Burileanu, "Voice activity detection for best signal selection in air traffic management and control systems," 2015 (Year: 2015).*

D. R. Johnson, V. I. Nenovand G. Espinoza, "Automatic Speech Semantic Recognition and verification in Air Traffic Control," 2013 (Year: 2013).*

Pham T. V., Kubin G.: WPD-based noise suppression using non-linearly weighted threshold quantile estimation and optimal wavelet shrinking. In Proc. Interspeech'05 Lisboa, Portugal Sep. 4-8, 2005 pp. 2089-2092. (Year: 2005).*

Ramirez et al., "A New Kullback-Leibler VAD for Speech Recognition in Noise", IEEE Signal Processing Letters, vol. 11, No. 2, Feb. 2004, 4 pages.

Ludena-Choez et al, "Speech Denoising Using Non-negative Matrix Factorization with Kullback-Leibler Divergence and Sparseness Constraints", Advances in Speech and Language Technologies for Iberian Languages: IberSPEECH 2012 Conference Madrid, Spain, Nov. 21-23, 2012. Proceedings, (pp. 207-216).

* cited by examiner

FIG. 7
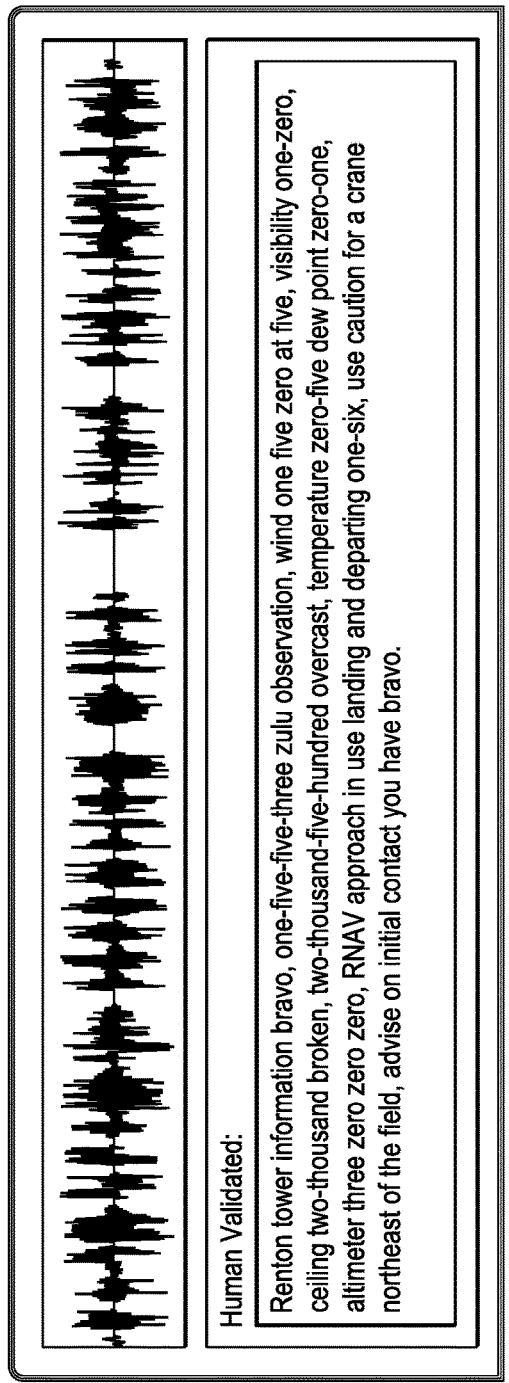
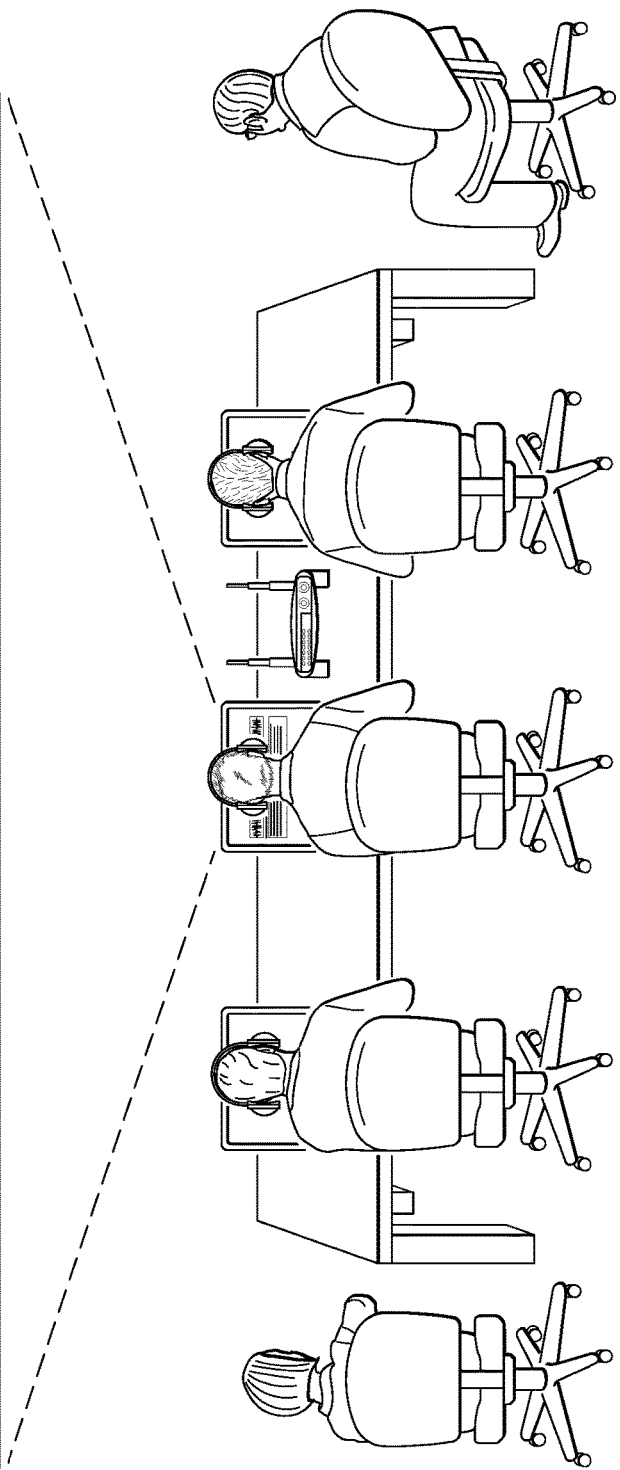

| 1002 TRANSCRIPTION DATA TYPES | 1004 GAMIFICATION | 1006 AUDIO TRANSPORT | 1008 ACCELERATED LABELING |
|---|---|---|---|
| ✓ ATIS Wx AND NOTAMs<br>✓ GROUND CLEARANCE<br>✓ IFR CLEARANCE DELIVERY<br>TAKEOFF CLEARANCE<br>LANDING CLEARANCE<br>CRUISE CLEARANCE<br>APPROACH CLEARANCE | LEADERBOARD<br>GLOBAL METRICS<br>INCENTIVES/PRIZES<br>SCORES<br>BADGES/CERTIFICATES | RANDOM SAMPLE SELECTION<br>PLAY/PAUSE<br>REWIND<br>REGION SELECTION<br>QUICK REWIND<br>10 SEC FORWARD/BACK<br>AUTO VOICE ACTIVITY DETECT | REAL-TIME LEARNING<br>INTELLISENSE TYPING<br>DROP-DOWN SNIPPETS (TYPE)<br>SEQUENTIAL INTELLIGENCE<br>COMMON ACRONYM/S (e.g., ILS)<br>SITUATIONAL AWARENESS |

| 1010 USER SURVEY | 1012 USER METRICS | 1014 TUTORIAL | 1016 USER DATA |
|---|---|---|---|
| USABILITY FEEDBACK<br>PILOT BACKGROUND<br>EAA MEMBERS<br>COMMENTS | TIME SPENT PER LABEL<br>LABEL COUNT ACCOMPLISHED<br>ACCURACY OF LABELING<br>DATASET COVERAGE | QUICK START<br>AUTOMATED EXAMPLE<br>DEMO LOOP (FOR SHOW)<br>SYNTAX HELPERS | LEGAL DISCLAIMER<br>OPT-IN<br>USER REGISTRATION<br>USER DATA |

FIG. 10

VOICE ACTIVITY DETECTION AND DIALOGUE RECOGNITION FOR AIR TRAFFIC CONTROL

This application claims the benefit of U.S. Provisional Patent App. No. 62/876,189, filed Jul. 19, 2019, the disclosure of which is incorporated herein by reference.

BACKGROUND INFORMATION

1. Field

The present disclosure relates generally to systems and methods for detecting voice activity in an audio signal and speech recognition.

2. Background

Artificial intelligence (AI) and machine learning (ML) can be used to reduce pilot workload in the area of air traffic control (ATC). Machine learning often employs labeled data sets to train the artificial intelligence. In the case, of speech recognition, errors in transcriptions (e.g. labels) translate into errors in the quality of speaker recognition in ML.

A typical Instrument Flight Rules (IFR) clearance begins with a filed IFR flight plan and ends with a pilot cleared for an IFR departure with five key sequential pieces of data ('C-R-A-F-T'). These data are commonly written by hand on paper, over a noisy and distracting channel of information flow and then readback manually from pilot to controller.

In order for autonomous vehicles to integrate into the existing airspace, equal or better communication with ATC is necessary. The majority of air traffic control communication occurs over VHF radio in the form of human speech. This speech can be interspersed with varying levels of noise and long segments of pauses or silence.

Therefore, there may be a need for a method and apparatus that take into account at least some of the issues discussed above, as well as other possible issues.

SUMMARY

Illustrative embodiments provide a method and system for communicating air traffic control information. An audio signal comprising voice activity is received. Air traffic control information in the voice activity is identified using an artificial intelligence algorithm. A text transcript of the air traffic control information in the voice activity is generated. The text transcript of the air traffic control information is displayed on a confirmation display.

Illustrative embodiments also provide a system and method for detecting voice activity in an audio signal. A power spectrum of the audio signal is determined. The power spectrum of the audio signal and a power spectrum of noise are compared to form a comparison. Portions of the audio signal that comprise speech are identified based on the comparison between the power spectrum of the audio signal and the power spectrum of the noise. Speech segments comprising the portions of the audio signal that comprise speech are then formed.

Features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

FIG. 7 depicts a crowd-sourcing laboratory in which multiple users participate in interpretation of auditory voice transcripts in accordance with illustrative embodiments;

FIG. 10 illustrates functional features of an audio transcription application in accordance illustrative embodiments;

DETAILED DESCRIPTION

Figure 1:
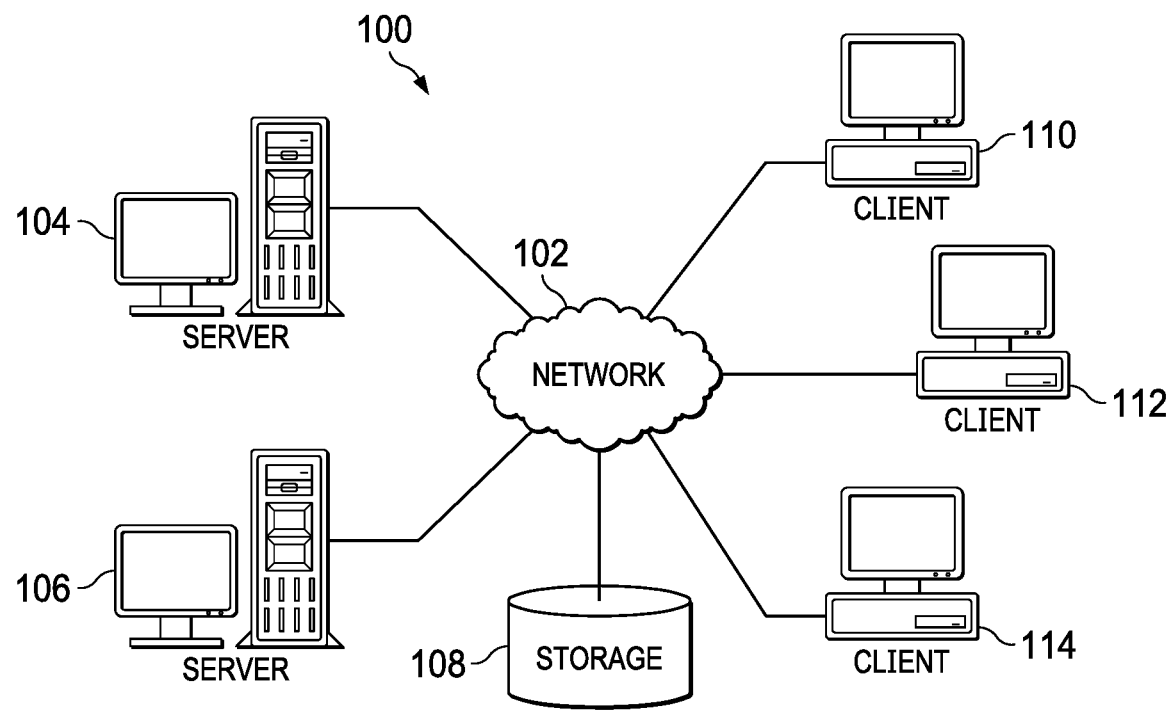
FIG. 1 is an illustration of a block diagram of an information environment in accordance with an illustrative embodiment.

The illustrative examples recognize and take into account different considerations. For example, the illustrative examples recognize and take into account that errors in speech transcriptions (e.g., labels) translate into errors in machine learning for speech recognition.

The illustrative embodiments also recognize and take into account that a typical clearance involves a key pieces of data that are commonly written by hand on paper, over a noisy and distracting channel of information flow and then read-back manually from pilot to controller.

Thus, the illustrative embodiments provide a method of using crowd-sourcing the human interpretation of aural ATC broadcasts and voice dialogue clearances to boost the rapid learning process of Automatic Speech Recognition (ASR). The application aims at the key population of expert labelers (e.g., transcriptionists) with the assumption that the best possible human generated labels will come from the aviation community consisting of not only pilots but air traffic controllers, aerospace engineers, and aviation enthusiasts of all types.

The illustrative embodiments also provide a digital audio communication flow, smart application, targeted speech-to-text, and an enhanced natural language processing context to create pop-up content on a mobile device that a pilot can more easily review, check off and read back to ATC with more efficiency and lower error than existing methods.

The ATC transcription application provides not only a way to help gather this input from the aviation community, but as an educational reinforcement of proficiency by connecting what is heard with what is viewed in text. The transcription application also gamifies the user experience by allowing users to select aviation-themed call-signs, observe how many transcriptions they have accomplished, and displaying the call-signs of the top 10 users who have completed the most transcriptions on a global leaderboard.

The illustrative embodiments also provide a method for heuristically establishing a confidence value associated with a transcription.

Illustrative embodiments detect voice activity in an audio signal, such as a radio transmission, by differentiating between noises and speech in the audio signal. Portions of the radio transmission or other audio signal which correspond only to speech are then segmented out. The use of such speech segments enhances the quality of data that machine learning-based speech recognition models may be trained upon and aids these trained models in more effectively interpreting the speech in raw audio signals.

Illustrative embodiments utilize a novel approach to statistically distinguish speech from noise within an audio signal. By plotting the signal distribution against a Gaussian noise distribution for a sliding analysis window across the signal, illustrative embodiments innovatively monitor deviations from noise. Mean squared error is used to quantify this deviation. Segments of the audio signal with a mean squared error deviation above a certain threshold are considered to have significant variation from noise and are classified as speech. Illustrative embodiments also may join together segments of speech separated by insignificant pauses to generate complete, coherent speech segments.

Novel features of the illustrative embodiments comprise, without limitation, the statistics-based comparison of an audio signal to a standard noise distribution. Illustrative embodiments are therefore able to differentiate speech from different levels of noise, regardless of the power level of the noise. Illustrative embodiments identify speech in an audio signal using a robust mean squared error comparison of the statistical distribution of the audio signal and standard noise. This determination may also be made through a slope comparison of a linear regression approximation of the distribution.

Illustrative embodiments provide speech segments for processing by artificial intelligence algorithms. Such speech segments may be joined together separated by short pauses in speech.

Voice activity detection in accordance with an illustrative embodiment may be used on recorded audio files, for speech segment creation to support artificial intelligence algorithm training. Alternatively, or in addition, illustrative embodiments may be used in real time for detection of speech in a live radio transmission or other live transmission of an audio signal.

Illustrative embodiments provide improvement over existing voice activity detectors which rely on power comparison and cannot differentiate different levels of noise. Illustrative embodiments also provide autonomous platforms with a more efficient way of determining and processing speech. Furthermore, illustrative embodiments provide artificial intelligence and machine learning models with rapid generation of audio segments without long strings of silence in the data.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, a programmable apparatus, or other device to produce a computer implemented process, such that the instructions which execute on the computer, the programmable apparatus, or the other device implement the functions and/or acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
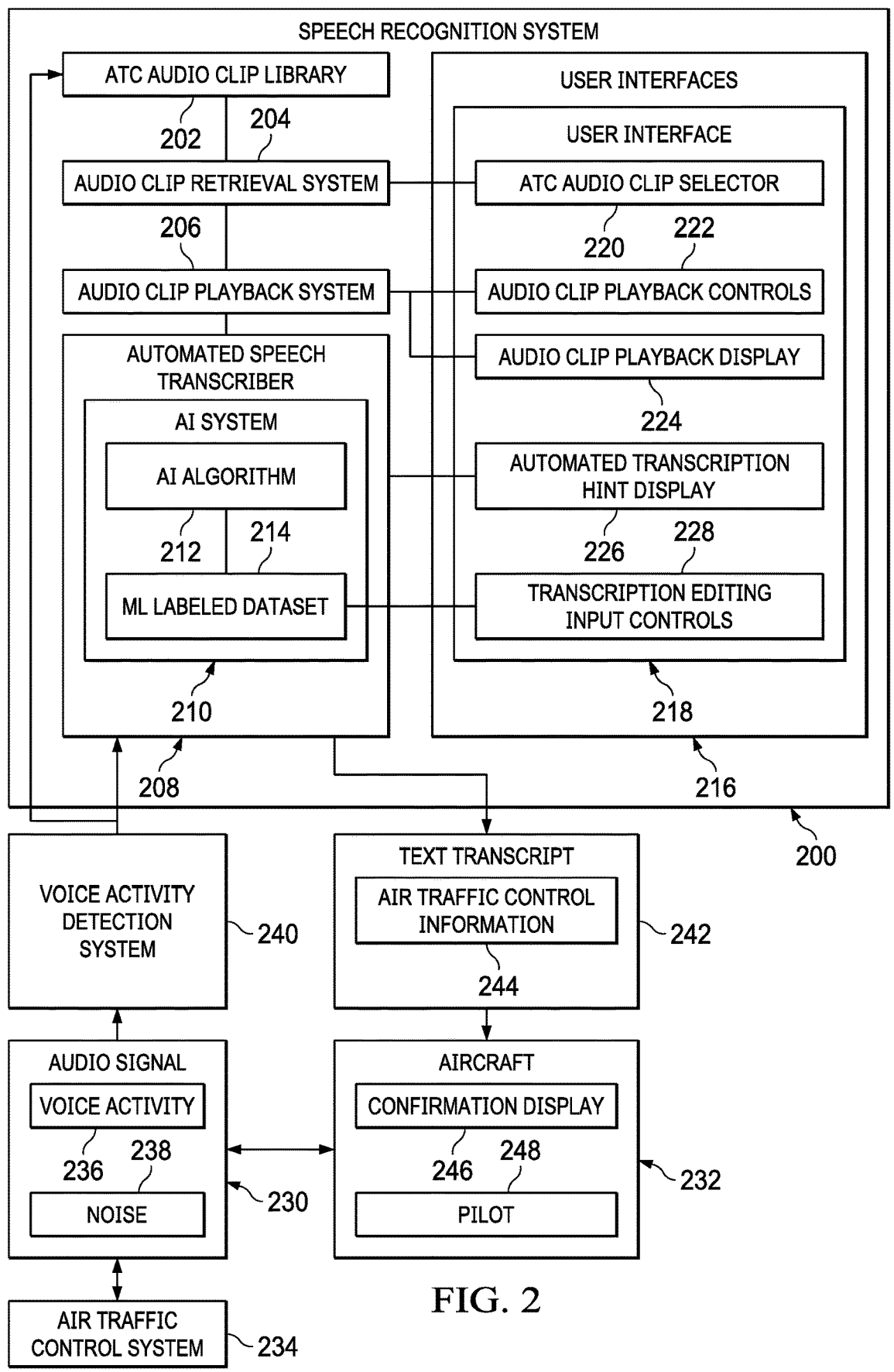
FIG. 2 depicts a block diagram of a speech recognition system in accordance with illustrative embodiments.

FIG. 2 depicts a block diagram of a speech crowd-sourced speech recognition system in accordance with illustrative embodiments. Speech recognition system 200 comprises a library 202 of ATC audio clips. Audio clips in the library 202 are accessed by a retrieval system 204 and loaded into a playback system 206.

An automated speech transcriber 208 provides a first-pass transcript of played audio clips to provide initial speech recognition hints to users. The transcriber uses artificial intelligence implemented in AI system 210 to perform the speech recognition transcription. AI system 210 employs AI algorithm 212 for speech recognition. AI algorithm 212 is trained with machine learning labeled dataset 214.

Crowd-sourcing expert input is provided by a number of user interfaces (UI) 216. Each UI 218 within the number of UIs 216 comprises an ATC audio clip selector 220 for retrieving audio clips from the library 202. The selection can be made automatically and randomly by the system or manually by the user. Playback controls 222 allow the user to hear and control playback of the selected audio clip. The UI 218 might also have a visual display 224 of the audio clip.

An automated transcription hint display 226 provides the user with the first-pass transcription of the audio clip performed by the AI 210 in the automated speech transcriber 208. The first-pass transcription relieves the user from having to transcribe from scratch, but rather allows for edit and correction of an existing transcription according to what the user hears in the audio clip.

Transcript editing input controls 228 allow the user to edit and correct the initial transcription and input the correction back to the AI 210, where it is used to update and improve the ML labeled training dataset 214.

There are three main categories of machine learning: supervised, unsupervised, and reinforcement learning. Supervised machine learning comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

Whereas supervised and unsupervised methods learn from a dataset, reinforcement learning methods learn from interactions with an environment. Algorithms such as Q-learning are used to train the predictive model through interacting with the environment using measurable performance criteria.

After AI algorithm 212 is trained, automated speech transcriber 208 may be used in an operational setting to transcribe audio signal 230 comprising communications between aircraft 232 and air traffic control system 234. For example, without limitation, audio signal 230 may comprise air traffic control radio communications between aircraft 232 and air traffic control system 234. Illustrative embodiments also may be used to transcribe audio signals other than air traffic control communications and other than communications between aircraft 232 and air traffic control system 234.

Aircraft 232 may be any type of aircraft configured to perform any appropriate task or mission. For example, without limitation, aircraft 232 may be a commercial passenger aircraft, a cargo aircraft, a military aircraft, a personal aviation aircraft, or any other appropriate type of aircraft. Aircraft 232 may be a fixed wing aircraft, a rotary wing aircraft, or any other appropriate type of aircraft. Aircraft 232 may be a manned or unmanned aircraft.

Audio signal 230 may include voice activity 236 and noise 238. Noise 238 may include any sounds in audio 230 signal that do not include voice activity 236. In accordance with an illustrative embodiment, audio signal 230 may be processed by voice activity detection system 240 to distinguish the portions of audio signal 230 that contain voice activity 236 from the portions of audio signal 230 that are noise 238. An example of one implementation of voice activity detection system 240 is voice activity detection system 2500, which is described in detail below with reference to FIG. 25.

Segments of audio signal 230 comprising voice activity 236 as determined by voice activity detection system 240 may be received by speech recognition system 200 for processing by automated speech transcriber 208 in real time as they are received. Alternatively, or in addition, segments of audio signal 230 may be saved as audio clips in ATC audio clip library 202 in speech recognition system 200.

Automated speech transcriber 208 is configured to process audio signal 230 using AI algorithm 212 to generate text transcript 242 of audio signal 230. In particular, text transcript 242 may include a text version of air traffic control information 244 identified in voice activity 236 in audio signal 230. For example, without limitation, air traffic control information 244 may include information related to air traffic control clearance and instructions from air traffic control system 234 to aircraft 232.

Air traffic control information 244 in text transcript 242 may be displayed on confirmation display 246. For example, without limitation, confirmation display 246 may be implemented in any appropriate display device on aircraft 232. Pilot 248 or other appropriate personnel on aircraft 232 may review air traffic control information 244 on confirmation display 246 to confirm and read back selected portions of air traffic control information 244 to air traffic control system 234. Alternatively, air traffic control information 244 in text transcript 242 may be used in any other appropriate manner on aircraft 232 that is manned or unmanned, by air traffic control system 234, or by any other appropriate system or entity.

Figure 3:
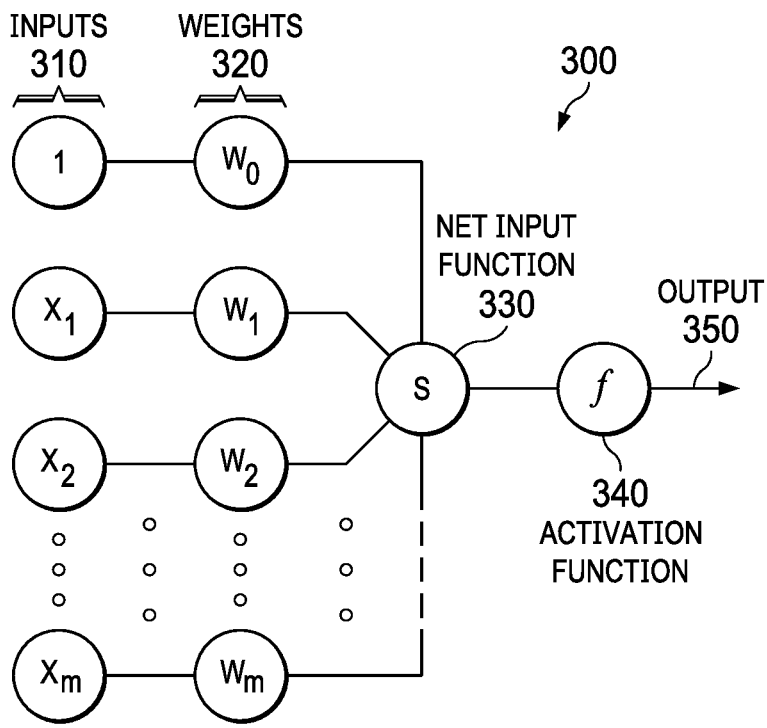
FIG. 3 is a diagram that illustrates a node in a neural network in which illustrative embodiments can be implemented.

FIG. 3 is a diagram that illustrates a node in a neural network in which illustrative embodiments can be implemented. Node 300 combines multiple inputs 310 from other nodes. Each input 310 is multiplied by a respective weight 320 that either amplifies or dampens that input, thereby assigning significance to each input for the task the algorithm is trying to learn. The weighted inputs are collected by a net input function 330 and then passed through an activation function 340 to determine the output 350. The connections between nodes are called edges. The respective weights of nodes and edges might change as learning proceeds, increasing or decreasing the weight of the respective signals at an edge. A node might only send a signal if the aggregate input signal exceeds a predefined threshold. Pairing adjustable weights with input features is how significance is assigned to those features with regard to how the network classifies and clusters input data.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between. Each layer's output acts as the next layer's input.

Figure 4:
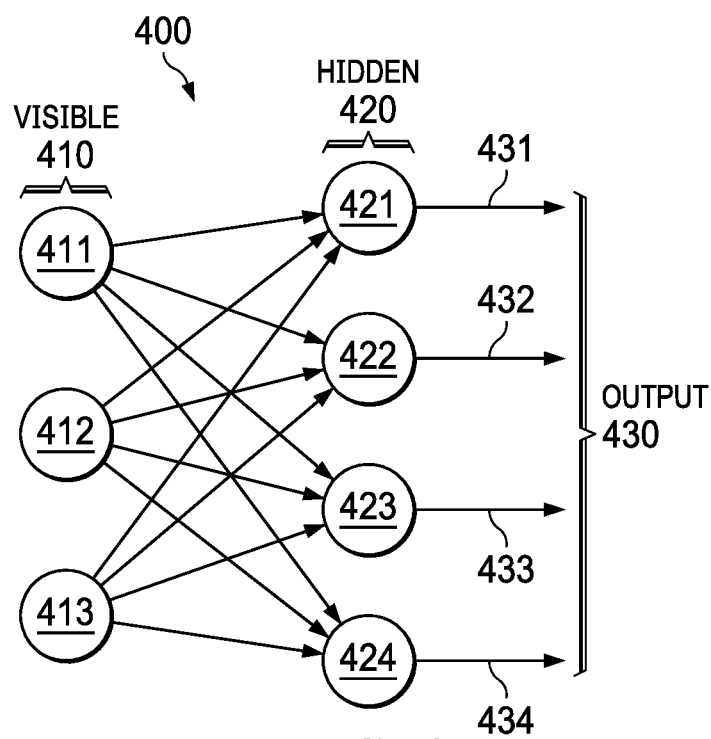
FIG. 4 is a diagram illustrating a neural network in which illustrative embodiments can be implemented.

FIG. 4 is a diagram illustrating a neural network in which illustrative embodiments can be implemented. As shown in FIG. 4, the nodes in the neural network 400 are divided into a layer 410 of visible nodes 411, 412, and 414 and a layer 420 of hidden nodes 421, 422, 423, and 424. The visible nodes 411, 412, and 414 are those that receive information from the environment (i.e. a set of external training data). Each visible node in layer 410 takes a low-level feature from an item in the dataset and passes it to the hidden nodes in the next layer 420. When a node in the hidden layer 420 receives an input value x from a visible node in layer 410 it multiplies x by the weight assigned to that connection (edge) and adds it to a bias b. The result of these two operations is then fed into an activation function which produces the node's output.

In symmetric networks, each node in one layer is connected to every node in the next layer. For example, when node 421 receives input from all of the visible nodes 411-413 each x value from the separate nodes is multiplied by its respective weight, and all of the products are summed. The summed products are then added to the hidden layer bias, and the result is passed through the activation function to produce output 431. A similar process is repeated at hidden nodes 422-424 to produce respective outputs 432-434. In the case of a deeper neural network, the outputs 430 of hidden layer 420 serve as inputs to the next hidden layer.

Training a neural network occurs in two alternating phases. The first phase is the "positive" phase in which the visible nodes' states are clamped to a particular binary state vector sampled from the training set (i.e. the network observes the training data). The second phase is the "negative" phase in which none of the nodes have their state determined by external data, and the network is allowed to run freely (e.g., the network tries to reconstruct the input). In the negative reconstruction phase the activations of the hidden layer 420 act as the inputs in a backward pass to visible layer 410. The activations are multiplied by the same weights that the visible layer inputs were on the forward pass. At each visible node 411-413 the sum of those products is added to a visible-layer bias. The output of those operations is a reconstruction r (e.g., an approximation of the original input x).

In machine learning, a cost function estimates how the model is performing. It is a measure of how wrong the model is in terms of its ability to estimate the relationship between input x and output y. This is expressed as a difference or distance between the predicted value and the actual value. The cost function (i.e. loss or error) can be estimated by iteratively running the model to compare estimated predictions against known values of y during supervised learning.

The objective of a machine learning model, therefore, is to find parameters, weights, or a structure that minimizes the cost function.

Gradient descent is an optimization algorithm that attempts to find a local or global minima of a function, thereby enabling the model to learn the gradient or direction that the model should take in order to reduce errors. As the model iterates, it gradually converges towards a minimum where further tweaks to the parameters produce little or zero changes in the loss. At this point the model has optimized the weights such that they minimize the cost function.

Neural networks can be stacked to create deep networks. After training one neural net, the activities of its hidden nodes can be used as training data for a higher level, thereby allowing stacking of neural networks. Such stacking makes it possible to efficiently train several layers of hidden nodes. Examples of stacked networks include deep belief networks (DBN), deep Boltzmann machines (DBM), convolutional neural networks (CNN), recurrent neural networks (RNN), and spiking neural networks (SNN).

Figure 5:
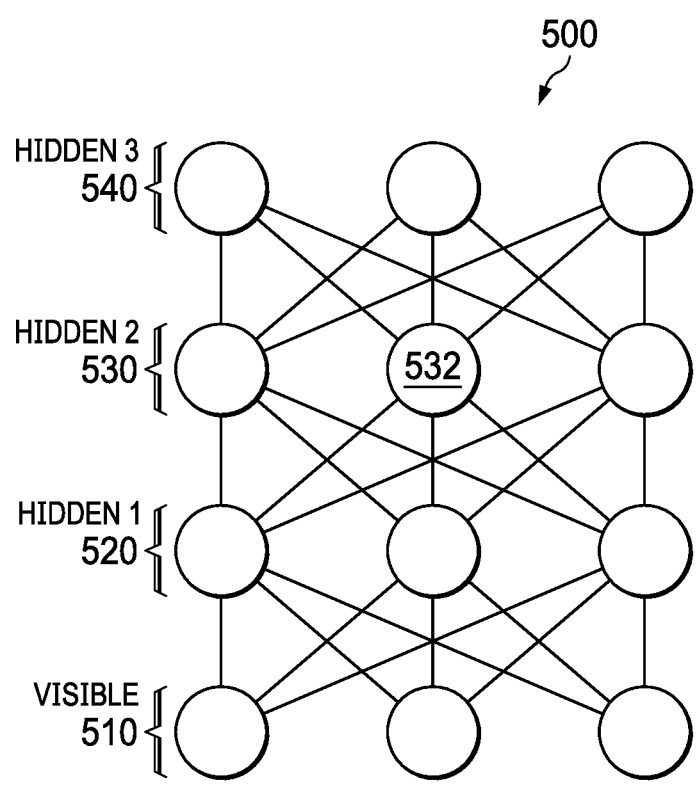
FIG. 5 is a diagram illustrating a deep neural network in which illustrative embodiments can be implemented.

FIG. 5 is a diagram illustrating a deep neural network (DNN) in which illustrative embodiments can be implemented. Deep neural network 500 comprises a layer of visible nodes 510 and multiple layers of hidden nodes 520-540. It should be understood that the number of nodes and layers depicted in FIG. 5 is chosen merely for ease of illustration and that the present disclosure can be implemented using more or less nodes and layers that those shown.

DNNs learn the hierarchical structure of features, wherein each subsequent layer in the DNN processes more complex features than the layer below it. For example, in FIG. 5, the first hidden layer 520 might process low-level features, such as, e.g., the edges of an image. The next hidden layer up 530 would process higher-level features, e.g., combinations of edges, and so on. This process continues up the layers, learning simpler representations and then composing more complex ones.

In bottom-up sequential learning, the weights are adjusted at each new hidden layer until that layer is able to approximate the input from the previous lower layer. Alternatively, undirected architecture allows the joint optimization of all levels, rather than sequentially up the layers of the stack.

Figure 6:
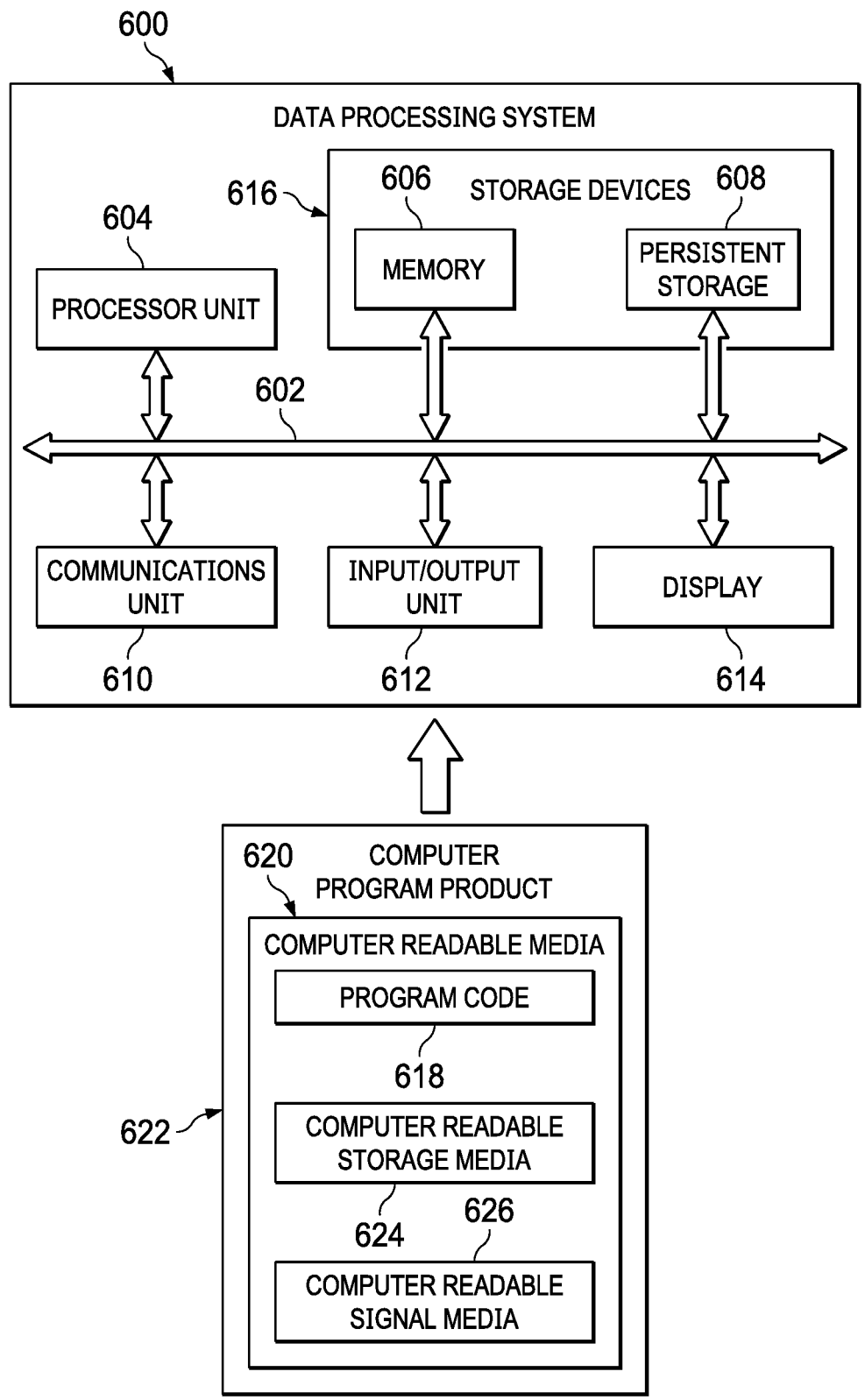
FIG. 6 is an illustration of a block diagram of a data processing system in accordance with an illustrative embodiment.

Turning now to FIG. 6, an illustration of a block diagram of a data processing system is depicted in accordance with an illustrative embodiment. Data processing system 600 may be used to implement one or more computers and client computer system 112 in FIG. 1. In this illustrative example, data processing system 600 includes communications framework 602, which provides communications between processor unit 604, memory 606, persistent storage 608, communications unit 610, input/output unit 612, and display 614. In this example, communications framework 602 may take the form of a bus system.

Processor unit 604 serves to execute instructions for software that may be loaded into memory 606. Processor unit 604 may be a number of processors, a multi-processor core, or some other type of processor, depending on the particular implementation. In an embodiment, processor unit 604 comprises one or more conventional general purpose central processing units (CPUs). In an alternate embodiment, processor unit 604 comprises a number of graphical processing units (CPUs).

Memory 606 and persistent storage 608 are examples of storage devices 616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 616 may also be referred to as computer-readable storage devices in these illustrative examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608. Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through at least one of a keyboard, a mouse, or some other suitable input device. Further, input/output unit 612 may send output to a printer. Display 614 provides a mechanism to display information to a user.

Instructions for at least one of the operating system, applications, or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer-usable program code, or computer-readable program code that may be read and executed by a processor in processor unit 604. The program code in the different embodiments may be embodied on different physical or computer-readable storage media, such as memory 606 or persistent storage 608.

Program code 618 is located in a functional form on computer-readable media 620 that is selectively removable and may be loaded onto or transferred to data processing system 600 for execution by processor unit 604. Program code 618 and computer-readable media 620 form computer program product 622 in these illustrative examples. In one example, computer-readable media 620 may be computer-readable storage media 624 or computer-readable signal media 626.

In these illustrative examples, computer-readable storage media 624 is a physical or tangible storage device used to store program code 618 rather than a medium that propagates or transmits program code 618. Alternatively, program code 618 may be transferred to data processing system 600 using computer-readable signal media 626.

Computer-readable signal media 626 may be, for example, a propagated data signal containing program code 618. For example, computer-readable signal media 626 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code 618.

ATC speech labeling provided by the illustrative embodiments randomly selects from thousands of segmented ATC recordings (short audio clips). Preliminary speech to text hints can be used to prompt the labeling process so all a user needs to do is correct the error words/phrases. An applicant can be custom designed and tailored to the aviation community where the most likely "expert labelers" exist. Additional "meta-data" such as location and Meteorological Terminal Aviation Routine Weather Report (METAR) reports can also be used to provide context awareness to the user.

Smart Labeling can be used to anticipate what users are wanting to type in context, and automatic looping over subsegments can be used to provide repetitive aural reinforcement when difficult speech segments are encountered. User metrics are kept in the background for downstream data science on the user effectivity (e.g., keeping a time log of each action on the UI).

Gamification of labeling can be used to create competitive incentives and prizes to motivate large samples of labels (e.g., leaderboard).

FIG. 7 depicts a crowd-sourcing laboratory in which multiple users participate in interpretation of auditory voice transcripts in accordance with illustrative embodiments. Crowd-sourcing human interpretation of aural ATC broadcasts and voice dialogue clearances takes advantages of the law of large numbers in improve accuracy and boost the rapid learning process of Automatic Speech Recognition. A transcription application provides not only a way to help gather this input from the pilot community, but an educational reinforcement of proficiency by connecting what is heard with what is viewed in text. Input from multiple users provides more accurate labeled data that can be used to train AI systems such as those illustrated in FIGS. 3-5 for speech recognition and transcription.

Figure 8:
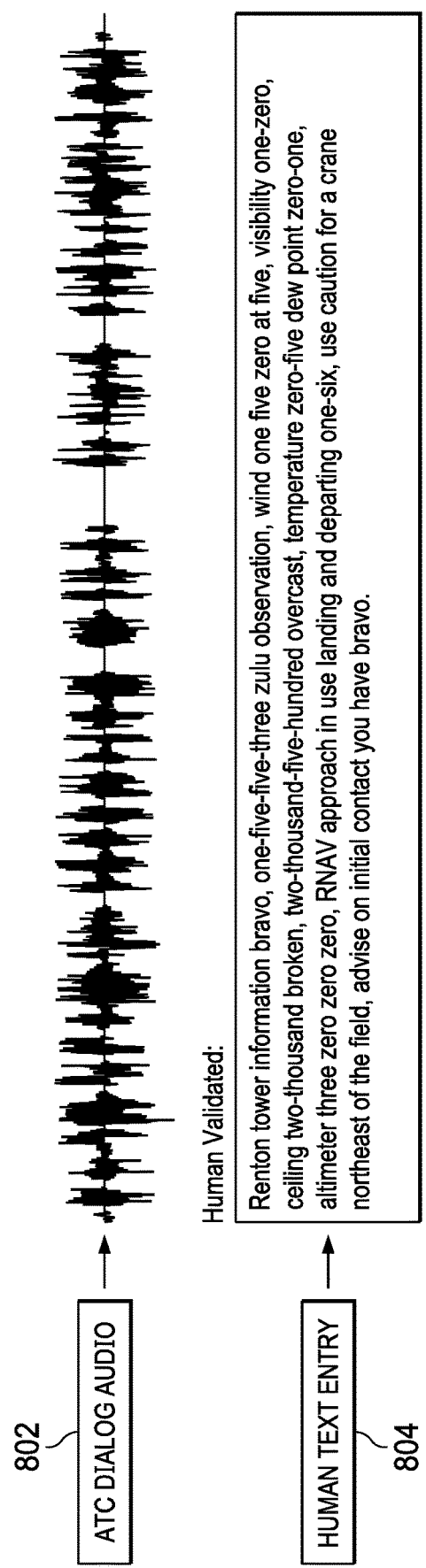
FIG. 8 depicts an example of human expert labels data in accordance with illustrative embodiments.

FIG. 8 depicts an example of human expert labels data in accordance with illustrative embodiments. Each user is presented with an ATC dialog audio clip 802. The user then provides a text entry 804 of what the user thinks is being stated in the audio clip 802.

Figure 9:
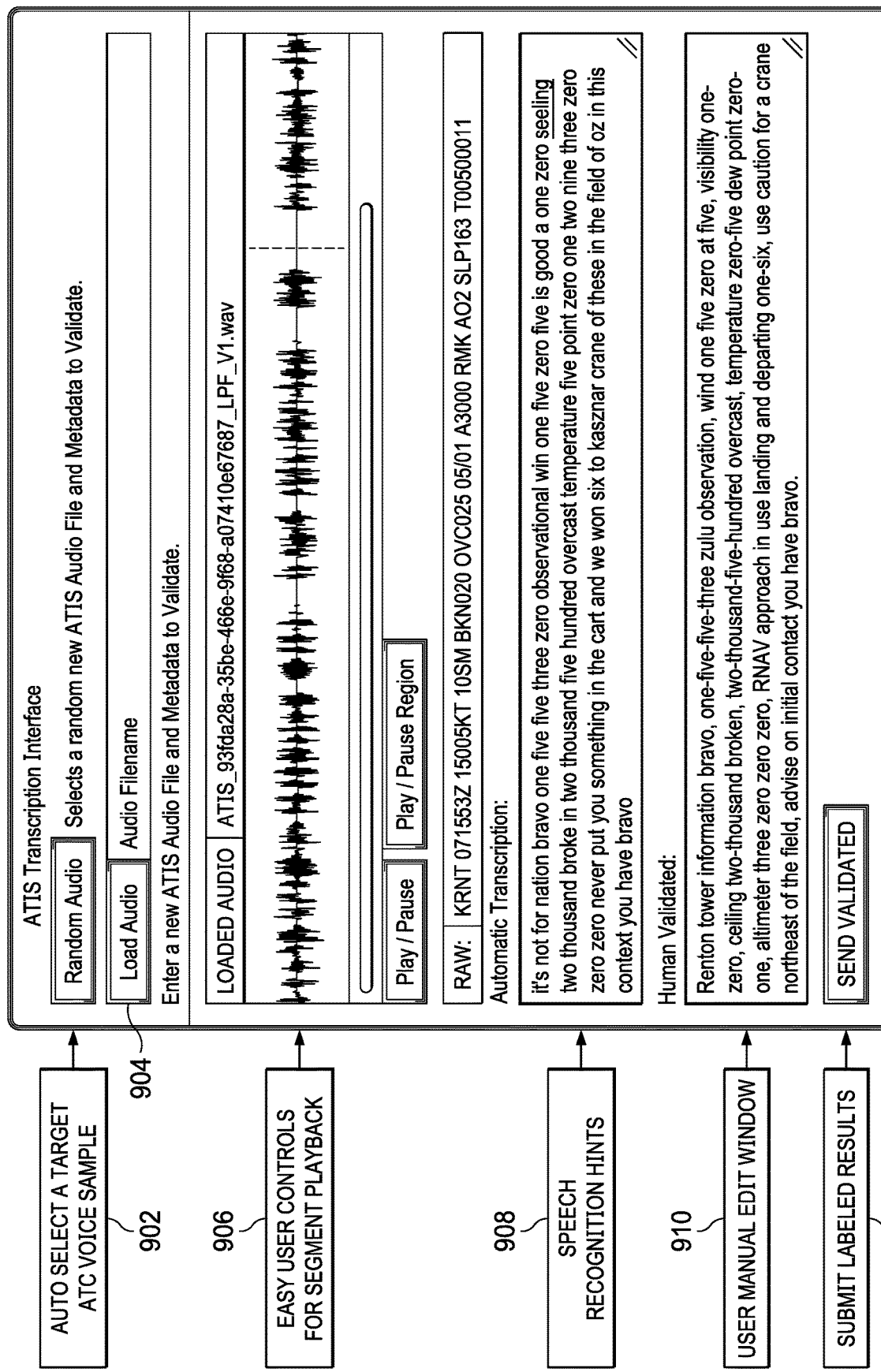
FIG. 9 depicts an example user interface for transcribing ATC audio clips in accordance with illustrative embodiments.

FIG. 9 depicts an example user interface for transcribing ATC audio clips in accordance with illustrative embodiments. Unser interface 900 includes a random audio clip selector 902 for retrieving a random automatic terminal information se/vice (ATIS) audio file and metadata for validation. UI 900 also has a manual selector 904 for entering a specific known audio file for retrieval.

Playback controls 906 allow the user to manually control the playback of the selected audio clip. Speech recognition hints 908 are provided by the AI system as an automated first attempt at transcribing the audio clip, so that the user does not have to perform the transcription from scratch.

The user edits to the transcription are displayed in validation window 910. Submit button 912 allows to enter the validated results. The results can be used by the AI system as improved labelled data to improve machine learning. Through iterative learning using labelled datasets provided through crowd-sourcing, the initial speech recognition hints 908 provided should progressively improve in accuracy over time.

FIG. 10 illustrates functional features of an audio transcription application in accordance illustrative embodiments. The application allows the user to select different types of transaction data 1002. Example of data types include ATIS Wx and Notices to Airmen (NOTAMs), ground clearance, and IFR clearance deliver such as takeoff, landing, cruise, and approach clearance.

Gamification 1004 can provide feedback to crowd-sourcing users such, e.g., as a leaderboard, global metrics, incentives/prizes, scores, and badges/certificates.

Audio transport 1006 provides a range of options to users for audio selection and playback. These options include, e.g., random sample selection, play/pause, rewind, clip region selection for hard to understand sections, quick rewind, 10 second forward/back, and auto voice activity detection.

Accelerated labelling 1008 provides, e.g., real-time learning, predictive typing, drop-down snippets (type), sequential intelligence, common acronyms (e.g., ILS), and situational awareness.

User survey 1010 provides an opportunity for users to improve the system through feedback. Examples include usability, pilot background, EAA members, and comments.

User metrics 1012 measure performance parameters such as, e.g., time spent per label, label count accomplished, accuracy of labelling, and dataset coverage.

A tutorial 1014 can be provided to help the user learn how to use the system. The tutorial 1014 can include topics such as, e.g., a quick start guide, an automated example, demo loops (for show), and syntax helpers.

User data 1016 comprises, e.g., legal disclaimers for using the system, user data details, opt-in provisions, and user registration.

Figure 11:
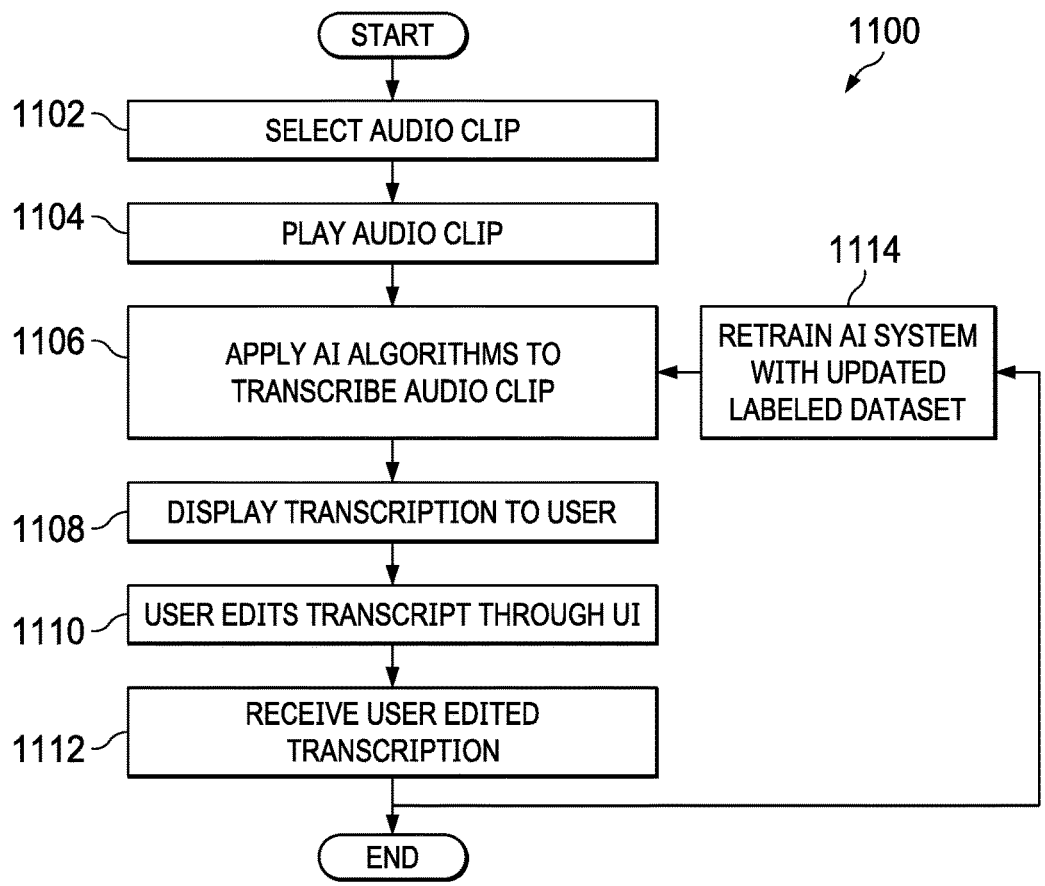
FIG. 11 is a flowchart depicting a method of obtaining expert user input to improve AI speech recognition in accordance with illustrative embodiments.

FIG. 11 is a flowchart depicting a method of obtaining expert user input to improve AI speech recognition in accordance with illustrative embodiments. Method 1100 can be implemented in a number of computer system employing artificial intelligence and machine learning as depicted in FIGS. 1-6.

Method 1100 begins by selecting an audio clip from an audio library (step 1102). The selection be performed randomly and automatically by the system or manually by a specific user selection. The system then plays the audio clip for the user (step 1104). The user has the ability to control playback manually to facilitate better understanding of difficult to understand sections of the audio clip.

The system applies AI algorithms to provide an initial transcription (step 1106) and displays speech recognition hints to the user (step 1108), so that the user is not beginning the transcription from scratch.

The user uses the UI to listen to the audio clip and edits the transcript according to the user's speech recognition and technical expertise (step 1110). The system receives the updated transcript from the user (step 1112) and uses it as an improved labeled dataset to retrain and improve the accuracy of the AI algorithm (step 1114).

The improved AI/ML speech recognition provided by the illustrative embodiments can be used to reduce pilot workloads regarding ATC with regard to IFR clearance. Illustrative embodiments intercept audio communications content from cockpit communications equipment, including radios, for example, transmitters, headsets, and similar communications equipment, and route it to a mobile device to provide analysis and input to the clearance application. An aural clearance is, therefore, both heard and processed by speech-to-text to provide a visual confirmation for pilot review and readback.

The illustrative embodiments provide fast and efficient processing of clearance, but adapted to existing methods pilots use to copy and readback clearances. Embodiments provide different options for system deployment between avionics audio, tablet PC, and cloud computing. Illustrative embodiments provide enhanced IFR Clearance Speech Processor and popup generation and an interactive UI for confirming each step of a 'C-R-A-F-T' (Clearance limit, Route, Altitude, Frequency, Transponder) clearance.

Figure 12:
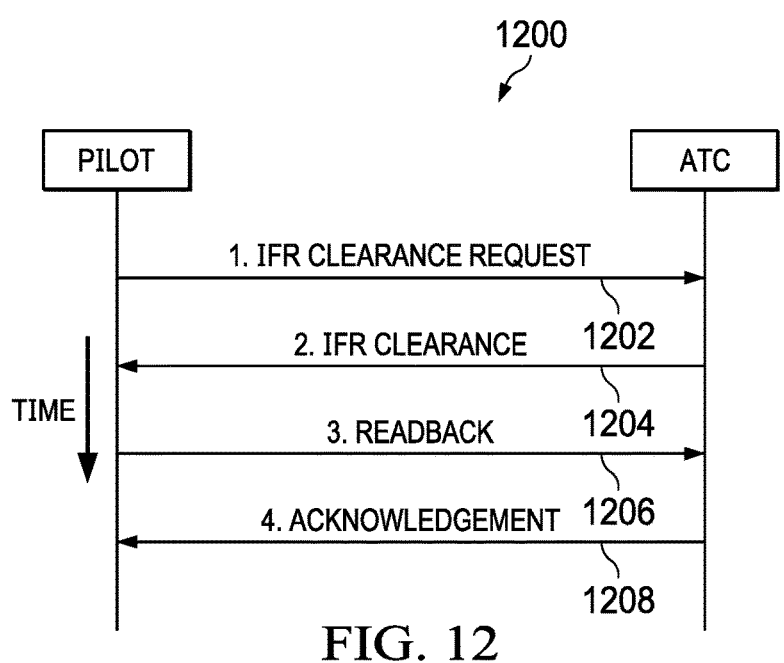
FIG. 12 depicts a process flow for IFR clearance in which illustrative embodiments can be used.

FIG. 12 depicts a process flow for IFR clearance in which illustrative embodiments can be used. Process 1200 begins with the pilot submitting an IFR clearance request to ATC (step 1202). IFR clearance is then sent back to the pilot (step 1204). The pilot reads back the clearance to confirm (step 1206). If the confirmation is correct, the pilot receives acknowledgement (step 1208).

Figure 13:
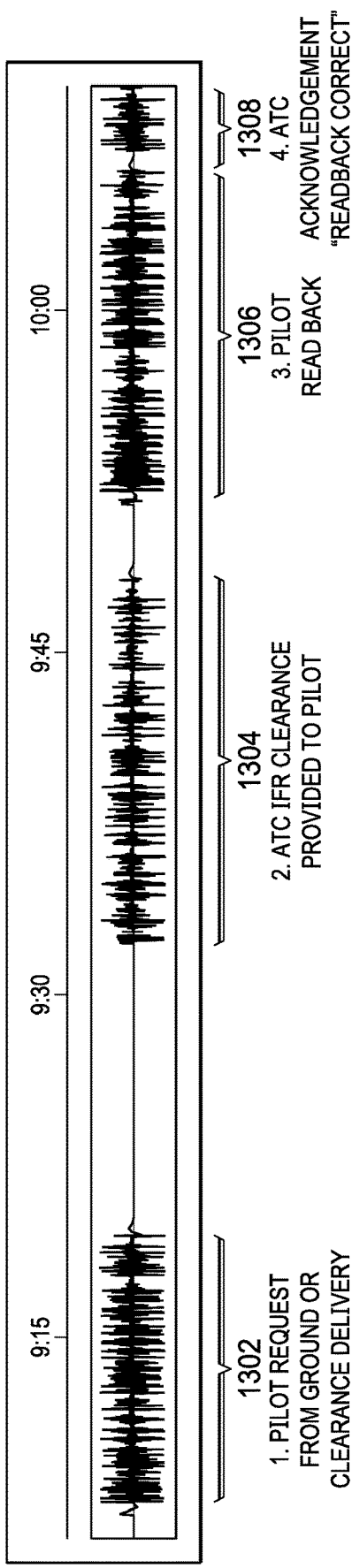
FIG. 13 depicts an IFR clearance audio communication sample in accordance with illustrative embodiments.

FIG. 13 depicts an IFR clearance audio communication sample in accordance with illustrative embodiments. The example audio signals illustrated in FIG. 13 correspond to the steps in FIG. 12. The first audio signal 1302 is the pilot's request from Ground for clearance delivery. The second signal 1304 is ATC IFR clearance provided to the pilot. The third signal 1306 is the pilot's readback of the clearance. And the fourth signal 1308 is the ATC acknowledgment that the readback is correct.

Figure 14:
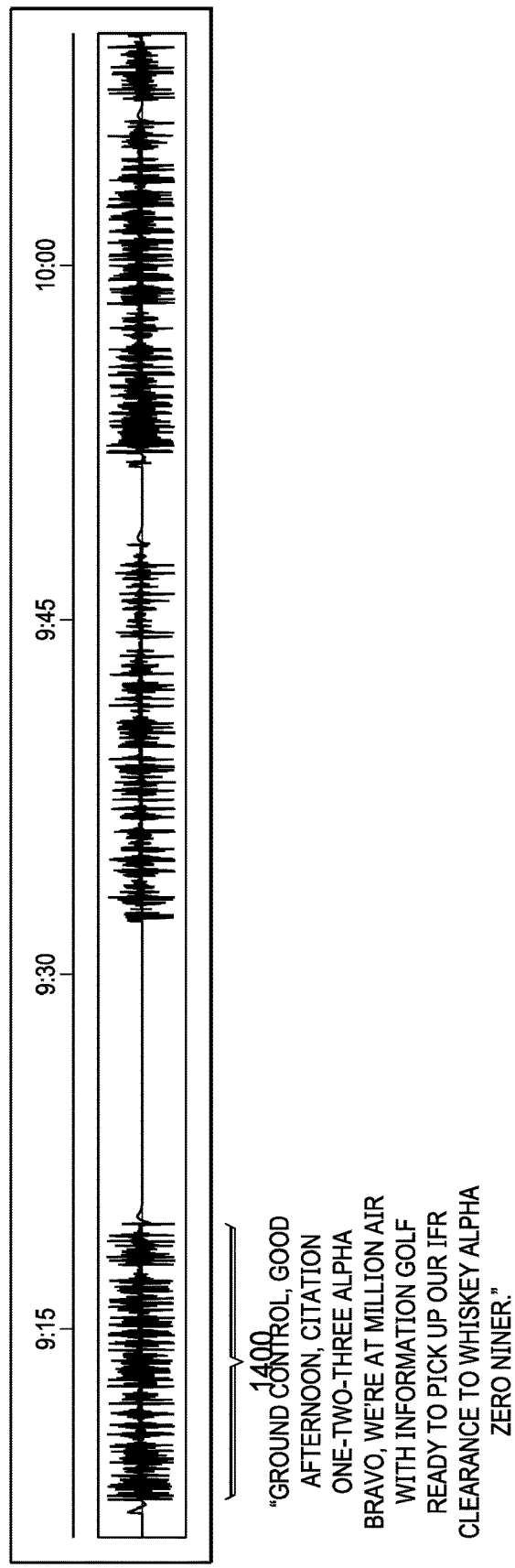
FIG. 14 depicts an example transcript of a pilot clearance request in accordance with an illustrative embodiment.

FIG. 14 depicts an example transcript of a pilot clearance request in accordance with an illustrative embodiment. Request 1400 is an example of a request in step 1202 in FIG. 12 and first audio signal 1302 in FIG. 13 and reads, "Ground Control, good afternoon, Citation one-two-three alpha bravo, we're at Million Air with information Golf ready to pick up our IFR clearance to whiskey alpha zero niner."

Figure 15:
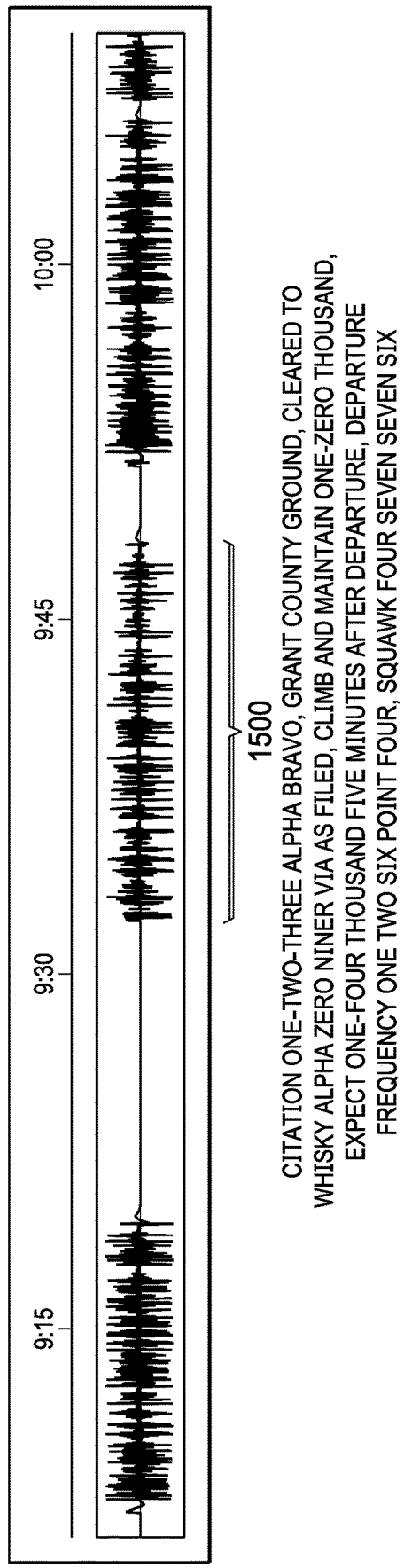
FIG. 15 depicts an example transcript of an ATC clearance in accordance with an illustrative embodiment.

FIG. 15 depicts an example transcript of an ATC clearance in accordance with an illustrative embodiment. Request 1500 is an example of a clearance in step 1204 in FIG. 12 and second signal 1304 in FIG. 13 and reads, "Citation one-two-three alpha bravo, Grant County Ground, cleared to whiskey alpha zero niner via as filed, climb and maintain one-zero thousand, expect one-four thousand five minutes after departure, departure frequency one two six point four, squawk four seven seven six."

Figure 16:
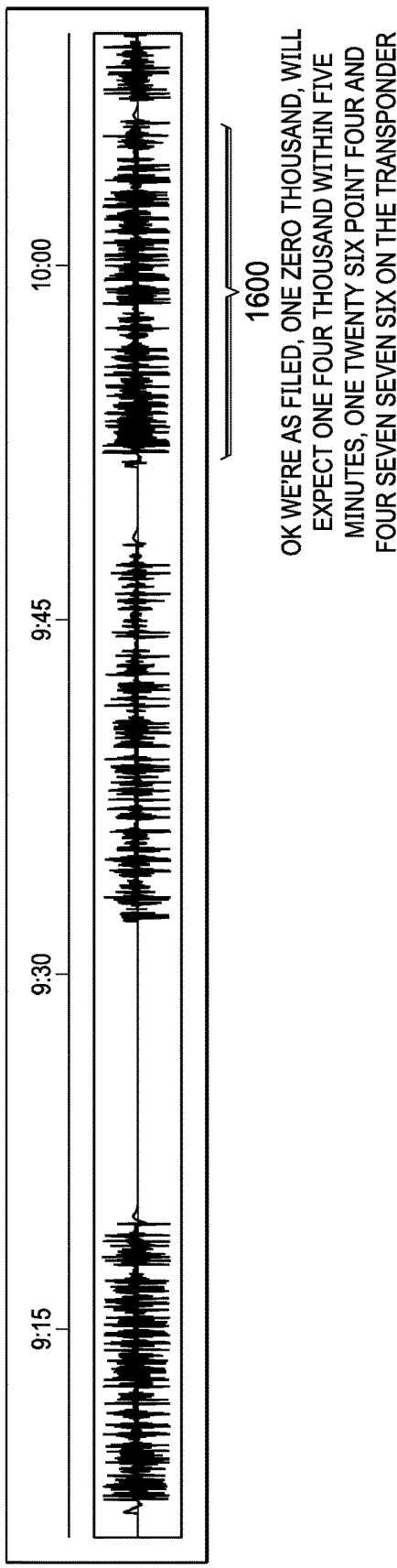
FIG. 16 depicts an example transcript of a pilot readback in accordance with an illustrative embodiment.

FIG. 16 depicts an example transcript of a pilot readback in accordance with an illustrative embodiment. Request 1600 is an example of a readback in step 1206 in FIG. 12 and third signal 1306 in FIG. 13 and reads, "Ok we're as filed, one zero thousand, will expect one four thousand within five minutes, one twenty six point four and four seven seven six on the transponder."

Figure 17:
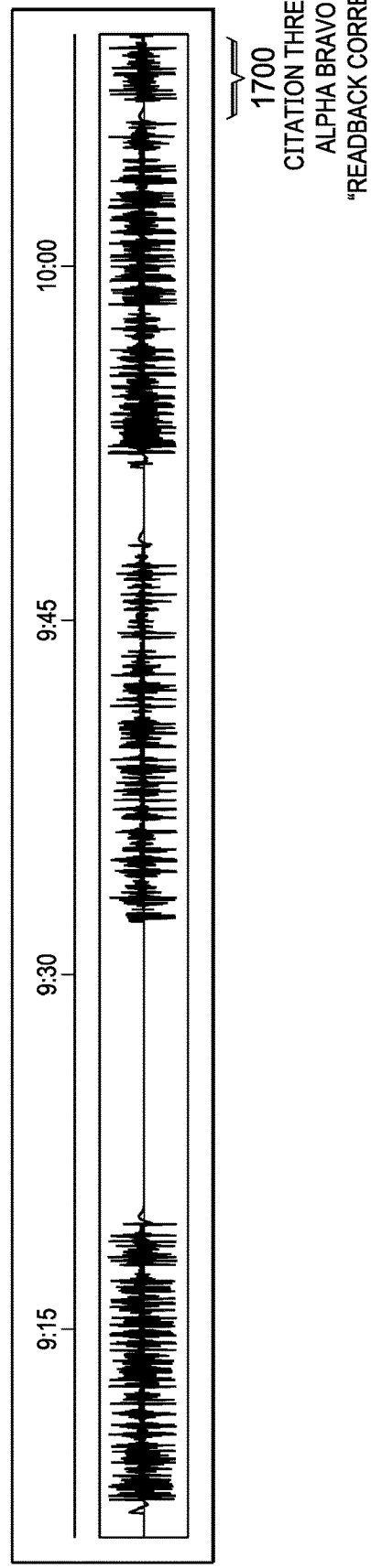
FIG. 17 depicts an example transcript of an ATC readback acknowledgement in accordance with an illustrative embodiment.

FIG. 17 depicts an example transcript of an ATC readback acknowledgement in accordance with an illustrative embodiment. Request 1700 is an example of an acknowledgment in step 1208 in FIG. 12 and fourth signal 1308 in FIG. 13 and reads, "Citation three alpha bravo 'readback correct.'"

Figure 18:
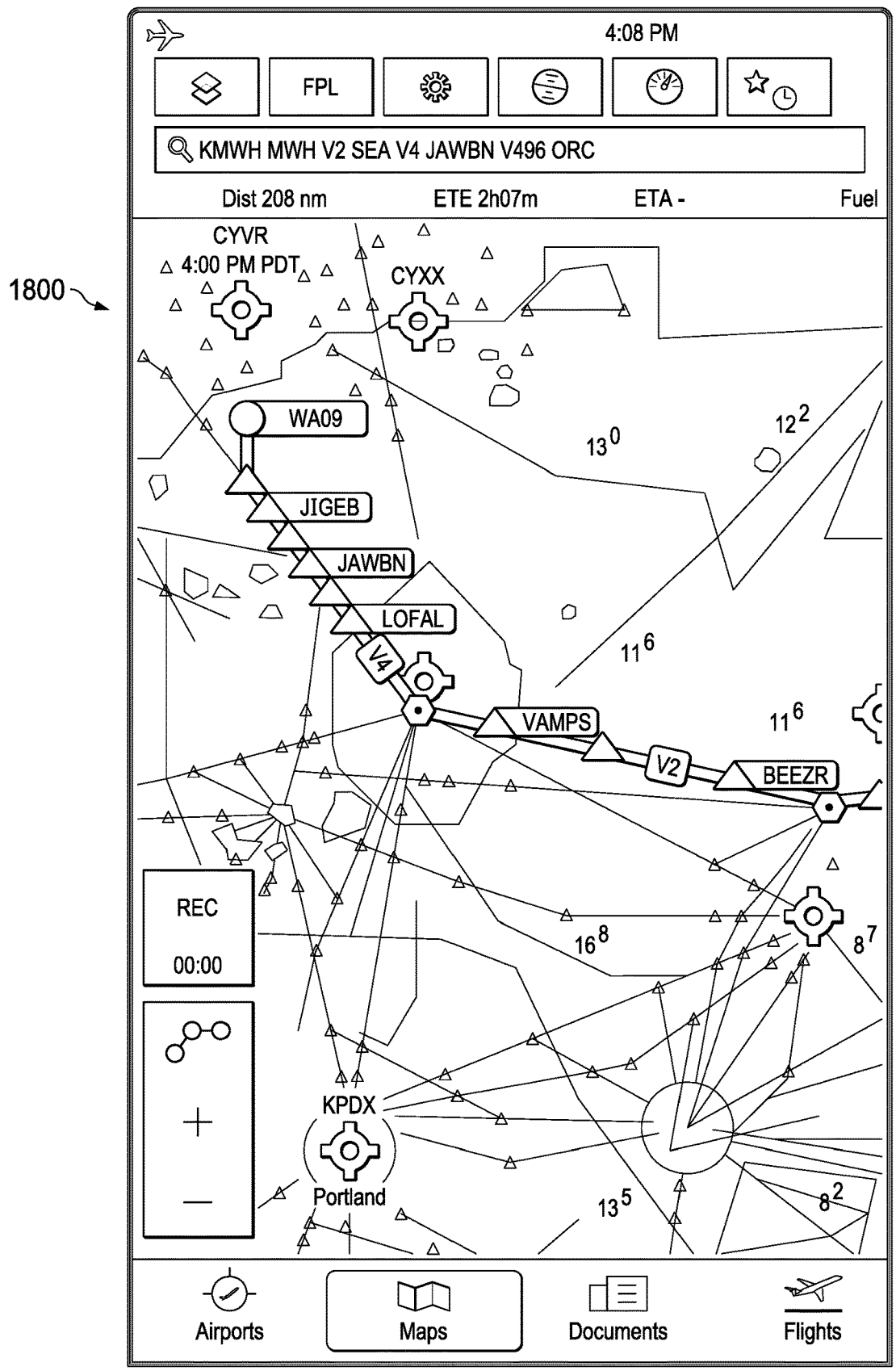
FIG. 18 depicts an example filed flight plan in accordance with illustrative embodiments.

FIG. 18 depicts an example filed flight plan 1800 in accordance with illustrative embodiments.

Figure 19:
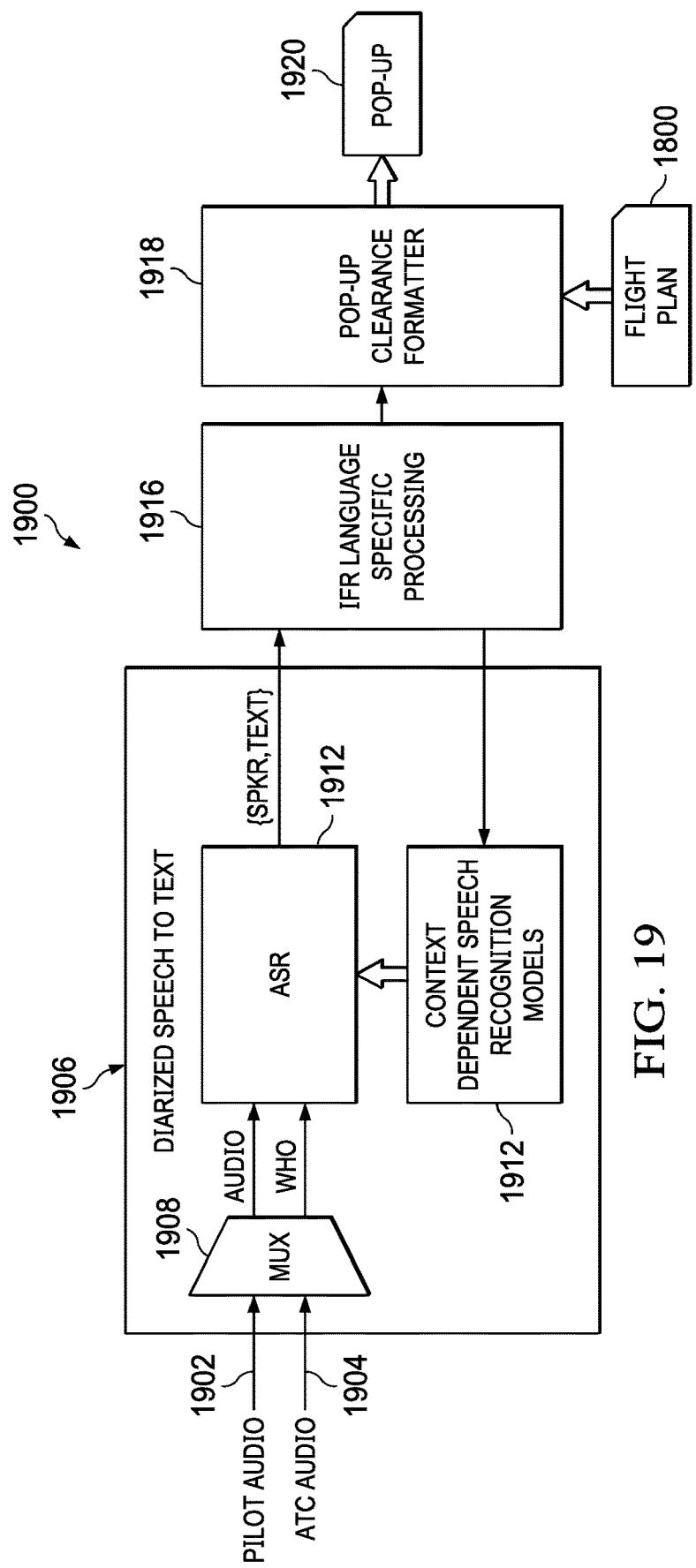
FIG. 19 is a block diagram depicting an IFR clearance speech recognition system in accordance with illustrative embodiments.

FIG. 19 is a block diagram depicting an IFR clearance speech recognition system in accordance with illustrative embodiments. System 1900 receives both a pilot audio stream 1902 and an ATC audio stream 1904. The audio streams are fed into a multiplexor 1908 within a diarized speech-to-text system 1906, which selects between either pilot audio stream 1902 or ATC audio stream 1904 and feeds the selected audio stream into an automated speech recognition system (ASR) 1910. The ASR 1910 processes the IFR clearance dialogue by using aviation context-dependent communication speech to text recognition models 1912 specifically tuned to the IFR clearance sequence.

The tuple 1914 of speaker and text are then sent to the natural language processor 1916 that is tuned for IFR clearance dialogue.

The output from the IFR natural language processor 1916 is sent to a pop-up clearance formatter 1918, which produces a pop-up 1920 that can be displayed on a flight plan, such as flight plan 1800 shown in FIG. 18.

Figure 20:
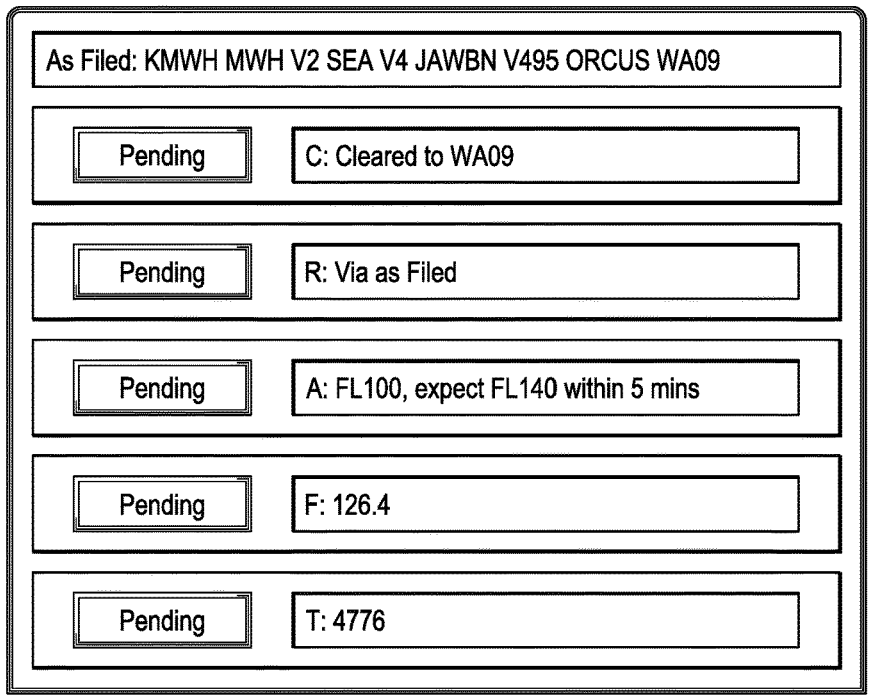
FIG. 20 depicts an example IFR CRAFT popup display in accordance with an illustrative embodiment.

FIG. 20 depicts an example IFR CRAFT popup display in accordance with an illustrative embodiment. Pop-up 2000 is an example of pop-up 1920 shown in FIG. 19.

Figure 21:
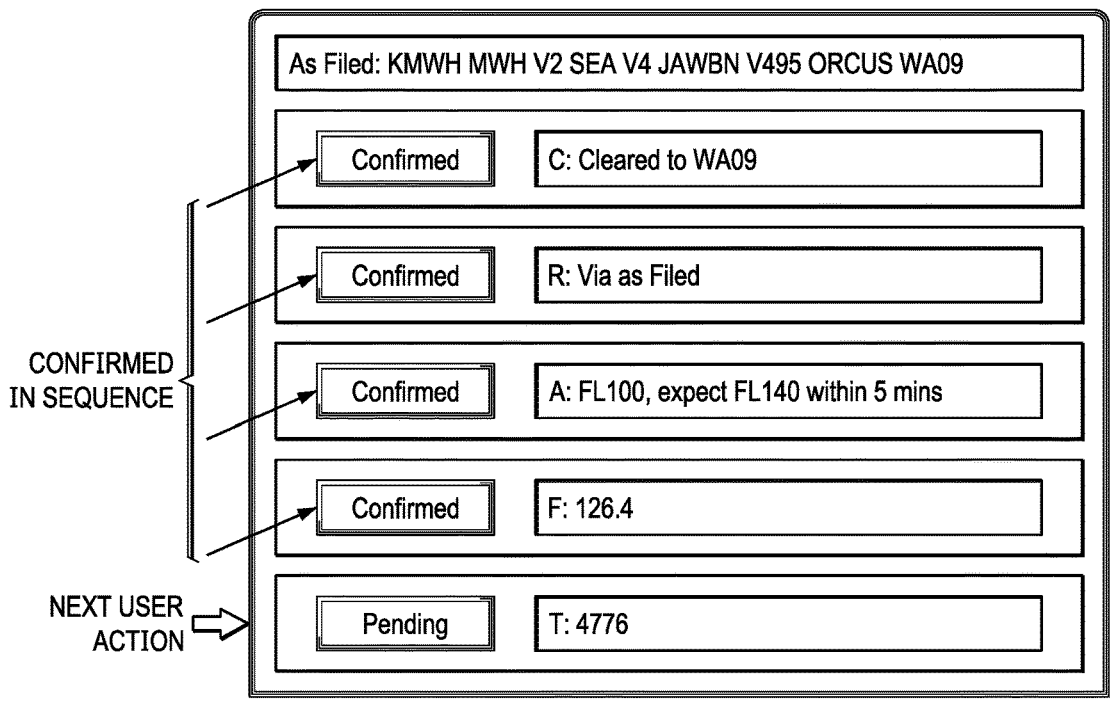
FIG. 21 depicts the CRAFT readback steps performed on an IFR pop-up in accordance with an illustrative embodiment.

FIG. 21 depicts the CRAFT readback steps performed on an IFR pop-up in accordance with an illustrative embodiment. In the example shown, the clearance limit, route, altitude, and frequency have already been confirmed, while confirmation of the transponder is still pending.

Figure 22:
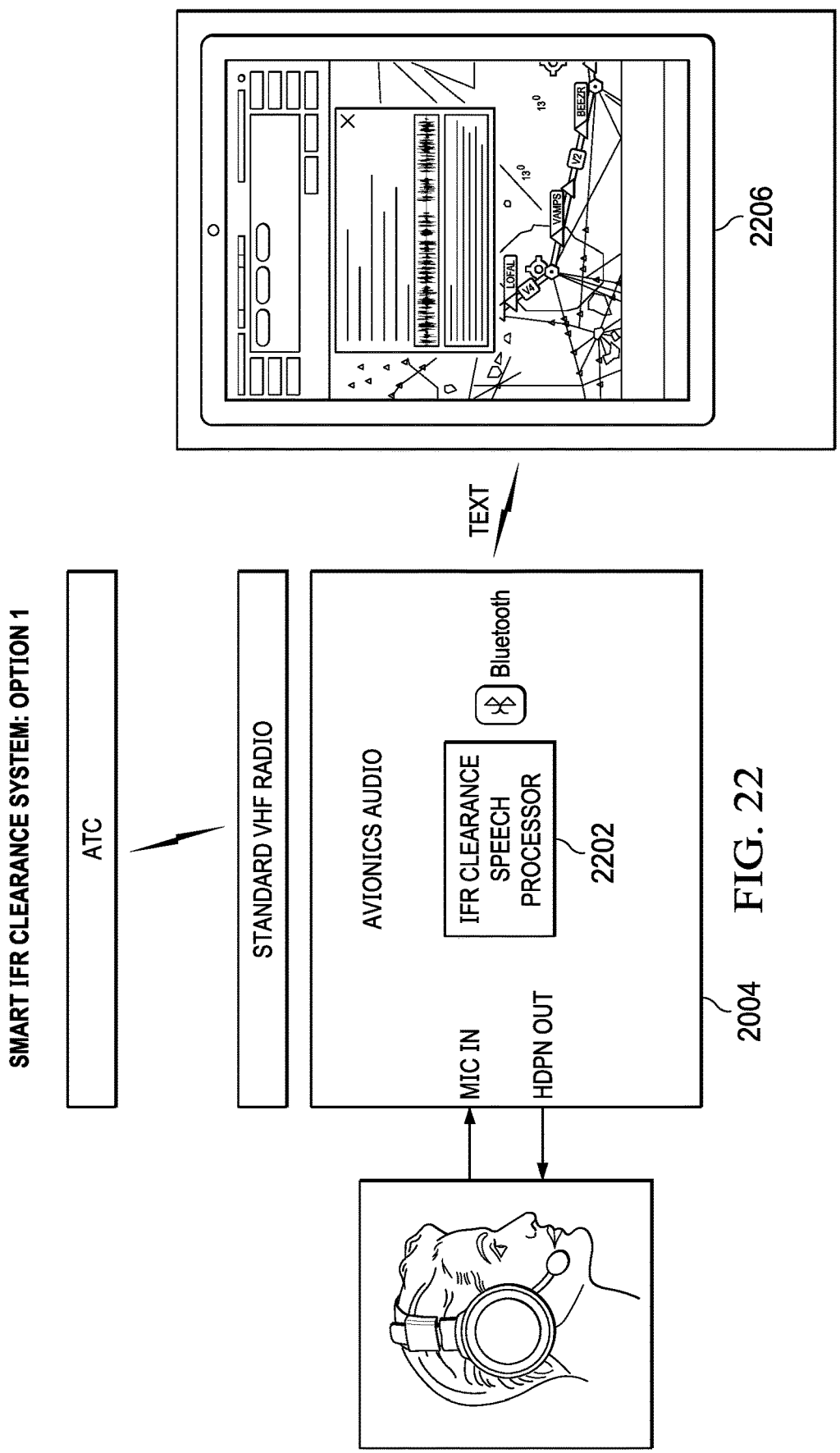
FIG. 22 depicts an AI IFR clearance system employing on-board speech recognition processing in accordance with an illustrative embodiment.

FIG. 22 depicts an AI IFR clearance system employing on-board speech recognition processing in accordance with an illustrative embodiment. In this embodiment, an enhanced DSP digital signal processing speech processor 2202 is added to a traditional avionics audio panel 2204 where the dialogue conversation can be processed on-board an audio Line Replaceable Unit (LRU). Alternatively, the speech processing element may be a component or module on tablet computer 2206. Text output as a result of the IFR Clearance Dialogue management function is passed to a tablet computer 2206 or other mobile device over a wireless channel such as Bluetooth®.

Figure 23:
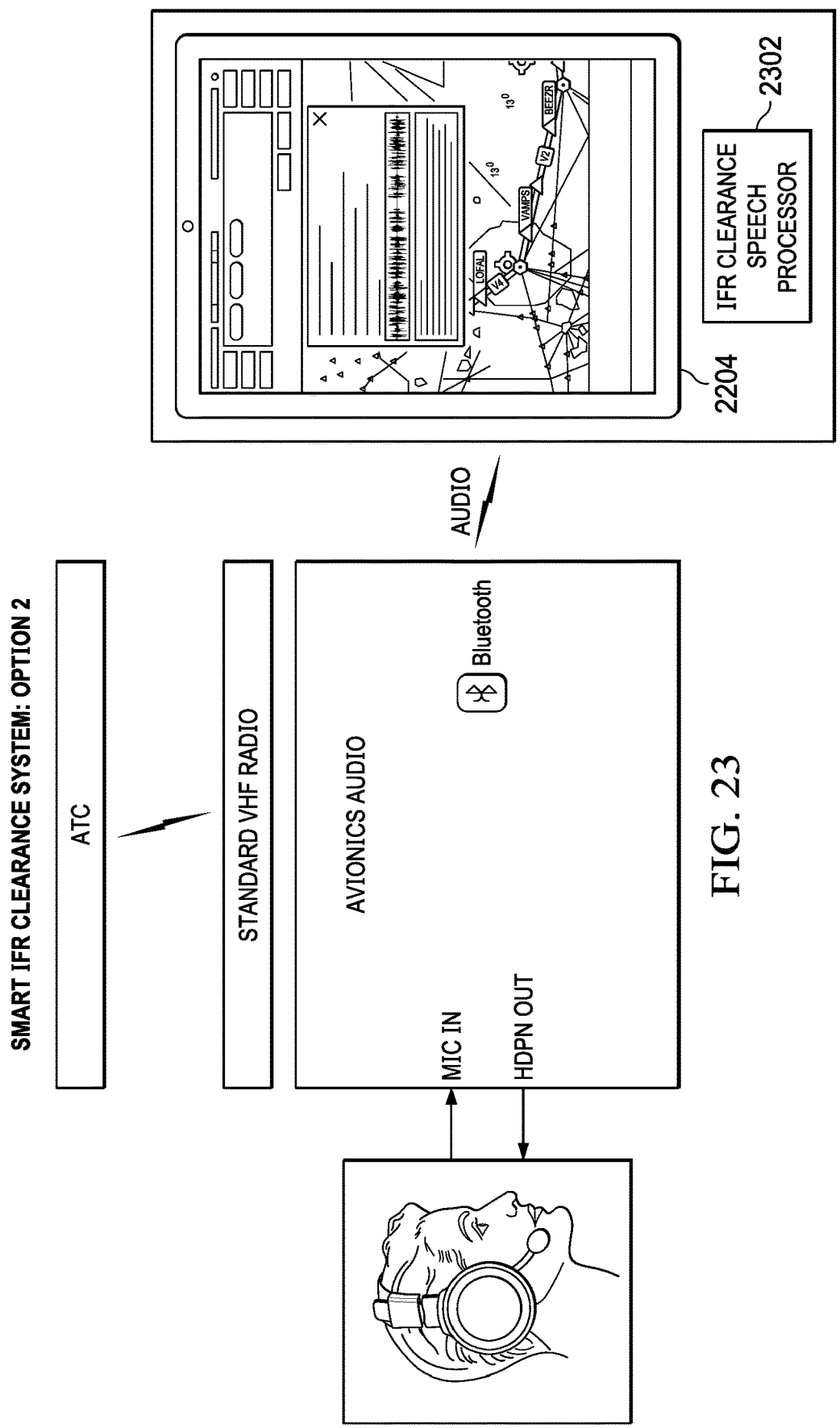
FIG. 23 depicts an AI IFR clearance system employing tablet-based speech recognition processing in accordance with an illustrative embodiment.

FIG. 23 depicts an AI IFR clearance system employing tablet-based speech recognition processing in accordance with an illustrative embodiment. In this embodiment, an enhanced DSP speech processing element 2302 is performed in software contained within a tablet personal computer 2304 by sending over the audio for both the ATC received message (clearance) as well as the pilot mic output.

Figure 24:
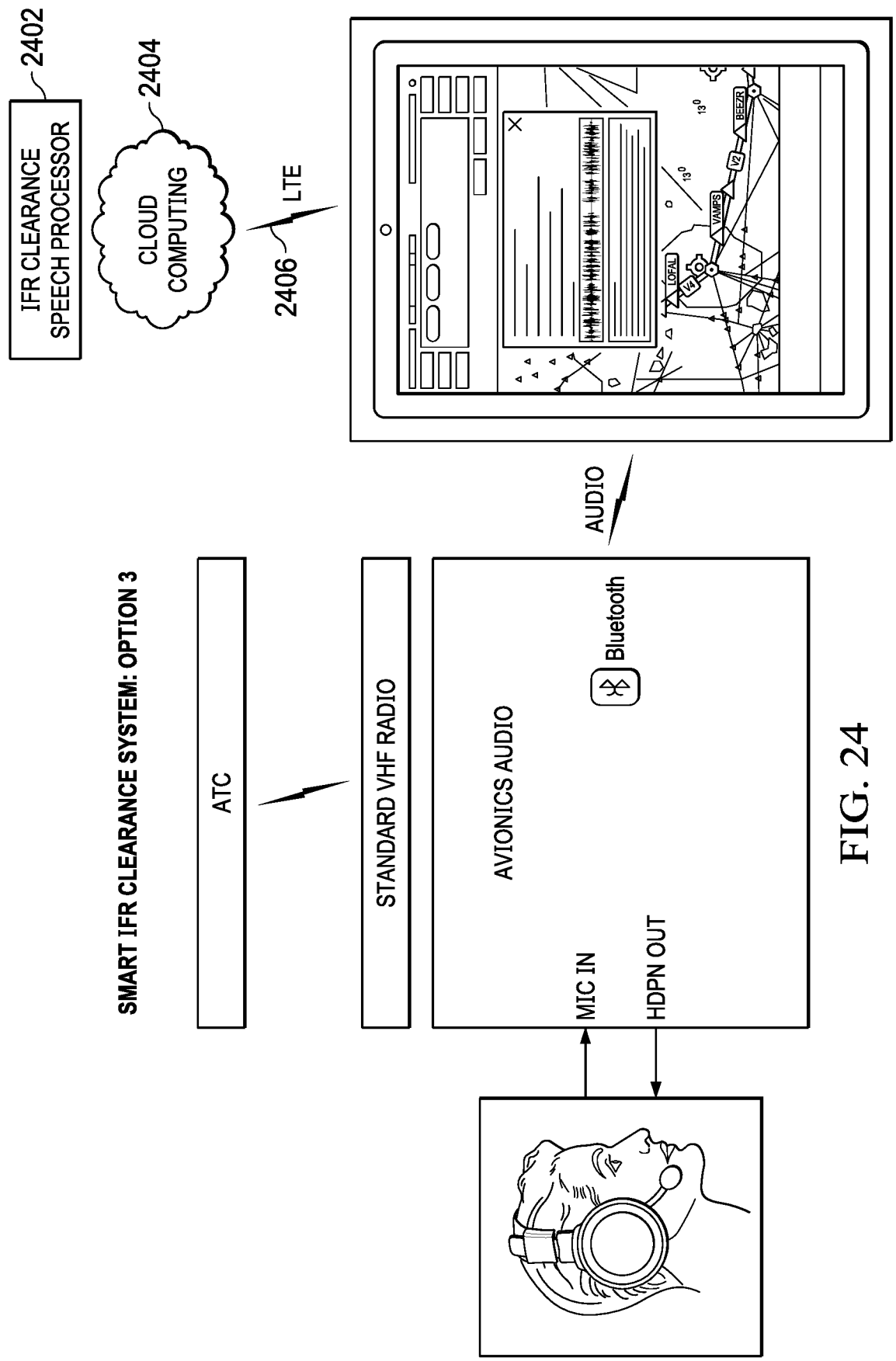
FIG. 24 depicts an AI IFR clearance system employing speech recognition processing in accordance with an illustrative embodiment.

FIG. 24 depicts an AI IFR clearance system employing speech recognition processing in accordance with an illustrative embodiment. In this embodiment, an enhanced speech dialogue processing element 2402 is performed in software hosted on cloud computing 2404 by sending audio dialogue over cellular wireless networks 2406 for both the ATC received message (clearance) as well as the pilot mic output. Alternatively, the speech recognition may be employed on as a software component on the tablet computer 2206.

Illustrative embodiments compare information in a flight plan, such as flight plan 1800, with the transcription to verify or evaluate a confidence of the accuracy of the transcription.

Figure 25:
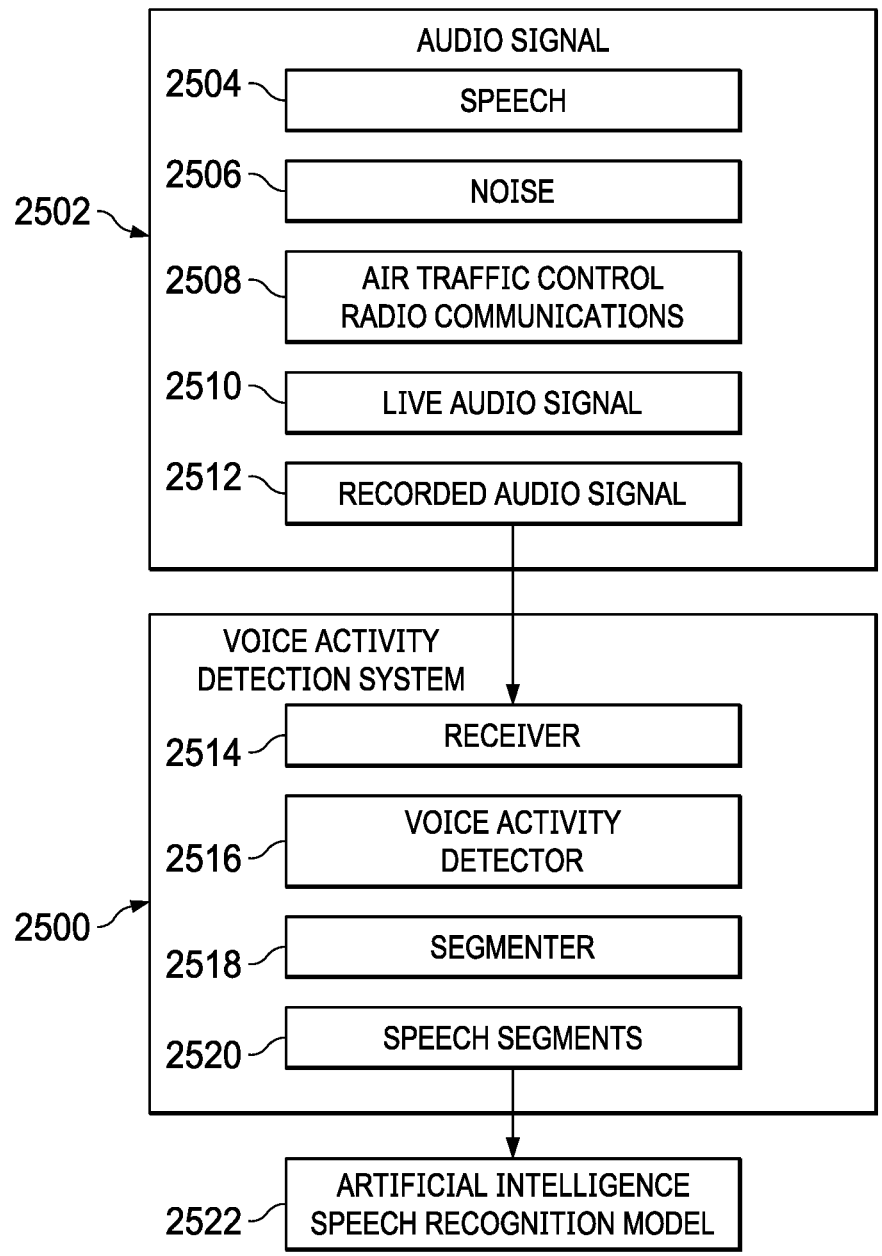
FIG. 25 is an illustration of a voice activity detection system in accordance with an illustrative embodiment.

Turning to FIG. 25, an illustration of a voice activity detection system is depicted in accordance with an illustrative embodiment. Voice activity detection system 2500 may be implemented in any appropriate manner. For example, voice activity detection system 2500 may be implemented in hardware or in hardware in combination with software. For example, without limitation, voice activity detection system 2500 may be implemented in any appropriate data processing system, such as data processing system 600 in FIG. 6.

Portions of audio signal 2502 may include human voice communications or speech 2504. Other portions of audio signal 2502 may include only noise 2506 and no speech 2504. Voice activity detection system 2500 is configured to identify those portions of audio signal 2502 that include speech 2504 by distinguishing between those portions of audio signal 2502 that include speech 2504 and those portions of audio signal 2502 that include only noise 2506 and no speech 2504.

Voice activity detection system 2500 may be configured to identify speech 2504 in any appropriate audio signal 2502 from any appropriate source and in any appropriate format. For example, without limitation, audio signal 2502 may comprise air traffic control radio communications 2508. Audio signal 2502 may be live audio signal 2510 or recorded audio signal 2512.

Voice activity detection system 2500 may comprise receiver 2514, voice activity detector 2516, and segmenter 2518. Receiver 2514 is configured to receive audio signal 2502 to be processed by voice activity detection system 2500. Voice activity detector 2516 is configured to process audio signal 2502 to identify the portions of audio signal 2502 that comprise speech 2504. Segmenter 2518 is configured to use various criteria to filter and combine the portions of audio signal 2502 that are determined to comprise speech 2504 into speech segments 2520. The criteria that are used to form speech segments 2520 may be selected as appropriate to form speech segments 2520 that are appropriate for any appropriate application. The functions performed by voice activity detector 2516 and segmenter 2518 are described in more detail below with reference to FIG. 26.

Speech segments 2520 provided by voice activity detection system 2500 may be used for any appropriate application. For example, without limitation, speech segments 2520 may be provided for use by artificial intelligence speech recognition model 2522. For example, speech segments 2520 derived by voice activity detection system 2500 from recorded audio signal 2512 may be used to train artificial intelligence speech recognition model 2522 to transcribe speech from an audio signal. Speech segments 2520 derived by voice activity detection system 2500 from live audio signal 2510 may be transcribed using artificial intelligence speech recognition model 2522.

The illustration of voice activity detection system 2500 in FIG. 25 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

Figure 26:
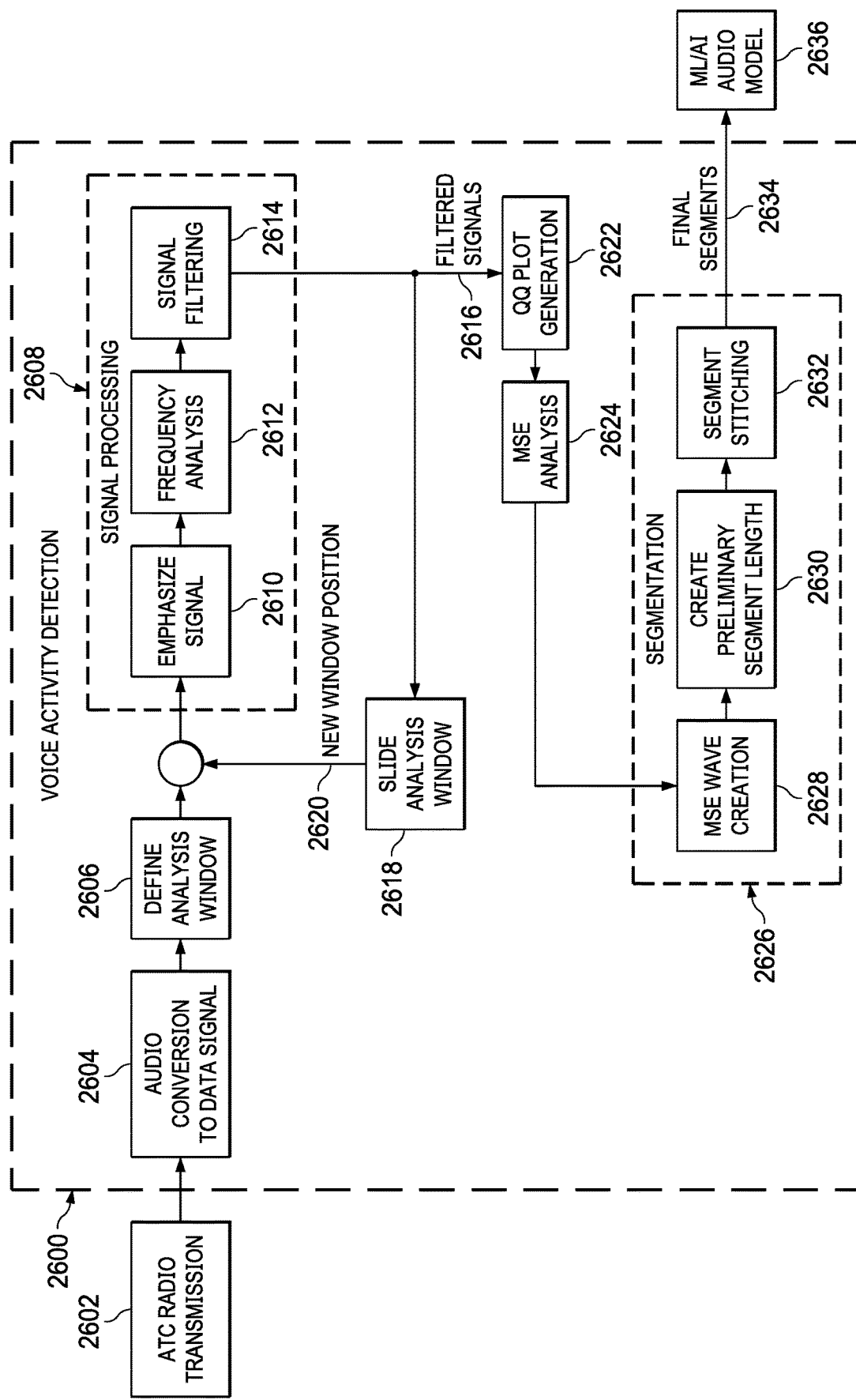
FIG. 26 is an illustration of a process of voice activity detection in accordance with an illustrative embodiment.

Turning to FIG. 26, an illustration of process for voice activity detection 2600 is depicted in accordance with an illustrative embodiment. Process for voice activity detection 2600 in accordance with an illustrative embodiment may be implemented, for example, in voice activity detection system 2500 in FIG. 25.

Figure 27:
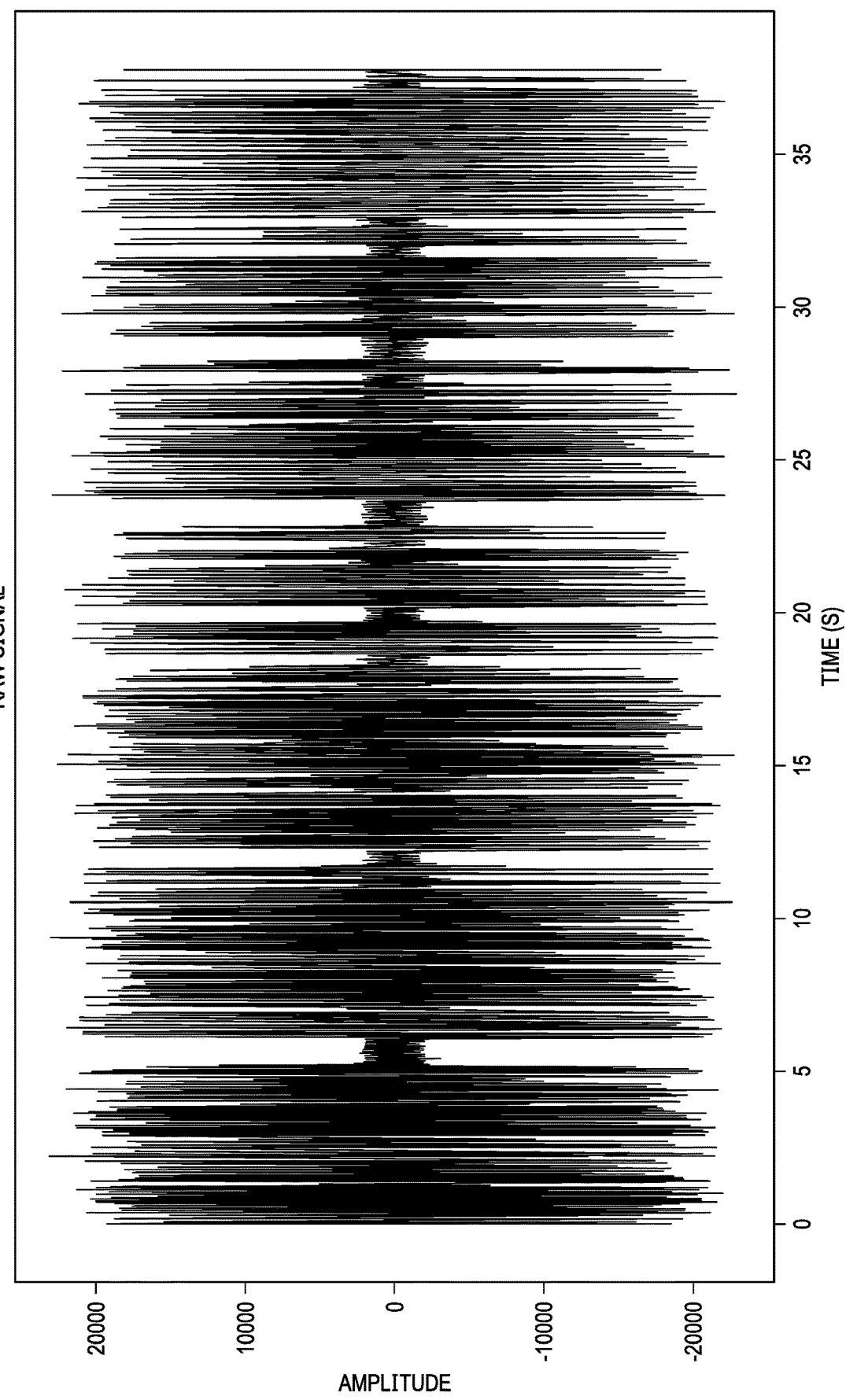
FIG. 27 is a waveform diagram illustration of a raw audio signal in accordance with an illustrative embodiment.

Process for voice activity detection 2600 in accordance with an illustrative embodiment may be configured to detect voice activity in an audio signal received from any appropriate source and in any appropriate format. For example, without limitation, process for voice activity detection 2600 may be configured to detect voice activity in air traffic control radio transmission 2602 or in another appropriate audio signal. For example, without limitation, a waveform diagram illustration of a raw audio signal that may be processed by voice activity detection in accordance with an illustrative embodiment is depicted in FIG. 27.

Process for voice activity detection 2600 may begin with audio conversion to data signal (operation 2604). Operation 2604 may include receiving in a wavfile audio or audio information in any other appropriate format and using any appropriate library or function to convert the audio file information to a data array. The sample rate of the audio file also may be extracted. Extraction of the sample rate be done agnostic of the file type so long as a data array of the audio file is made.

Operation 2604 also may be done in two modes: on an existing file or on a steady stream of data. With the existing file, only one array may be made. With the steady data stream, multiple arrays may be made and staged in order to allow queueing of the analysis.

An analysis window then may be defined (operation 2606). Operation 2606 defines how the audio data is analyzed in chunks. The size of this window determines how much of the array is analyzed. It is defined in terms of time. So essentially how big of a time segment is analyzed at a time.

This is different from the time window specified in known methods for voice activity detection. In previous methods, an entire audio signal is analyzed at once. In previous methods the definition of the window is separate from the specific signal processing over segments.

The window in voice activity detection in accordance with an illustrative embodiment allows for analyzing the audio signal transiently by only looking at portions of the audio at a time and sliding over a certain step size. Use of this analysis window helps to determine how the audio transforms over time and to capture multiple detections of voice activity. An analysis window in accordance with an illustrative embodiment may be seen as a macro window with a similar micro window within it for the signal processing transformations.

In accordance with an illustrative embodiment, the micro window within the signal processing block does the following: The signal is split into small frames for later concatenation so that when a Fourier transform is applied, the more detailed frequency curves of the signal are not lost in averaging. A Hamming window is applied to reduce spectral leakage and to specify for the fast Fourier transform, FFT, that the data is finite.

Process for voice activity detection 2600 then may proceed with signal processing 2608. In accordance with an illustrative embodiment, signal processing 2608 may include emphasizing a signal (operation 2610), frequency analysis (operation 2612), and signal filtering (operation 2614) for each of the analysis windows.

Emphasizing a signal (operation 2610) may include pre-emphasis of the signal being processed by amplifying the higher frequencies. In accordance with an illustrative embodiment, the higher frequencies may be amplified to balance the frequency spectrum, that is, to balance the magnitudes of the high frequencies and low frequencies. Operation 2610 may be performed for the entire signal before framing. For example, operation 2610 may be performed before the new window position.

In frequency analysis (operation 2612) a Fourier transform is applied to the frames and the power spectrum of the signal is determined. The power spectrum of a signal is the power or more simply the energy of the signal at each frequency that it contains. For example, without limitation, operation 2612 may include applying a short-time Fourier transform, STFT, to the signal to determine the power spectrum.

In signal filtering (operation 2614), triangular filters are applied to the power spectrum on a mel scale to extract frequency bands. The mel scale attempts to portray the non-linear human ear perception of sound, by being more distinctive at lower frequencies and less distinctive at higher frequencies. The output of operation 2614 is filtered signals 2616.

After signal processing 2608 is performed for a particular analysis window, the analysis window may be moved by sliding the analysis window (operation 2618) to new window position 2620 in the signal. Operation 2618 ties into the defining of the analysis window in operation 2606. Operation 2618 may include redefining the time bounds of the analysis window. Operation 2618 may be adapted to working on both live data and recorded data.

After the signal processing 2608 is complete, a quantile-quantile, Q-Q, plot comparison is made of the resulting output as compared to Gaussian noise (operation 2622). A quantile-quantile plot is a probability plot, which is a graphical method for comparing two probability distributions by plotting their quantiles against each other. A quantile-quantile plot comparison comprises plotting the statistical distribution of one data set versus a known or target statistical distribution. In accordance with an illustrative embodiment, it is desirable to differentiate between intended speech and random noise. Therefore, in accordance with an illustrative embodiment, the target statistical distribution preferably may be that of random or Gaussian noise. Alternatively, the target distribution may be any other appropriate data distribution of interest.

In accordance with an illustrative embodiment, the quantile-quantile plot is the precursor of how a voice activity determination is made. Two methods of making this determination have been developed. Each of these methods is based on the differences between the shape of the calculated curve in the quantile-quantile plot and the shape of the control curve. The control curve is a 45 degree straight line. Calculated curves could take the shape of a curve characterized by any number of polynomials. Calculated curves also may change over time depending on the data present in the macro window.

Figure 28:
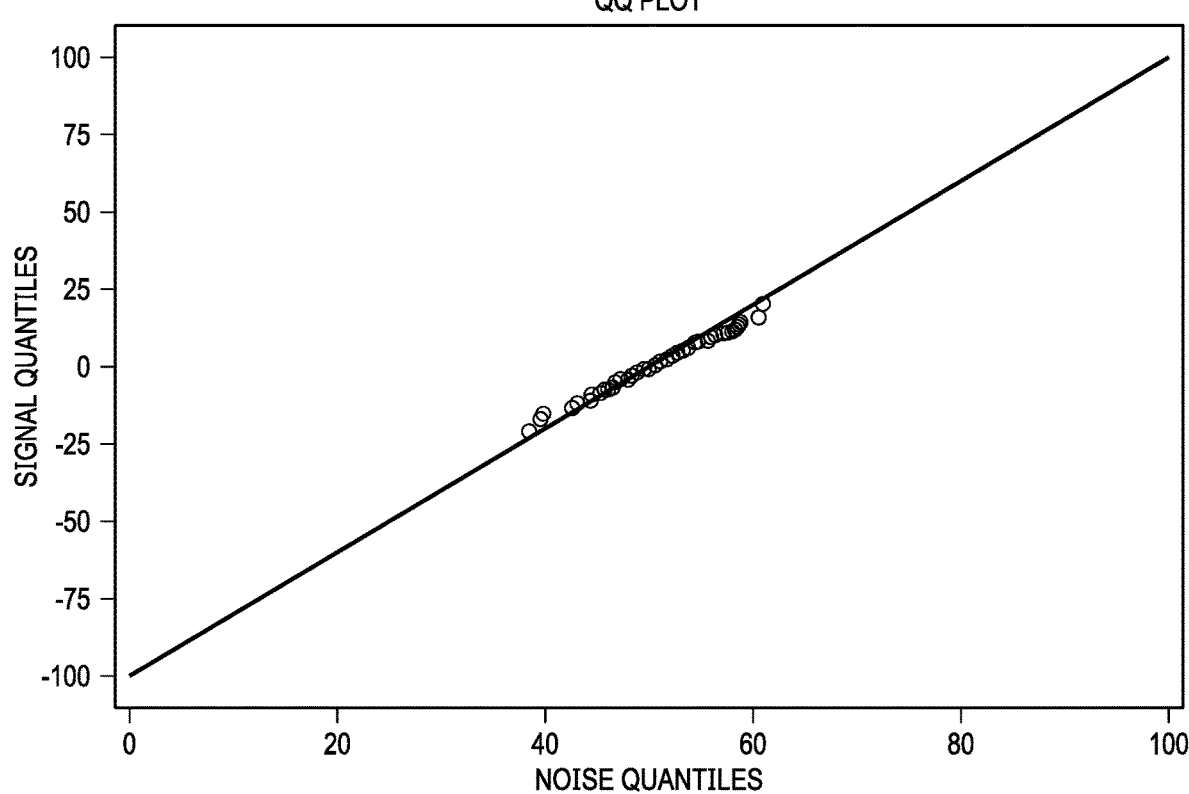
FIG. 28 is an illustration of an example of a quantile-quantile plot in accordance with an illustrative embodiment.
Figure 29:
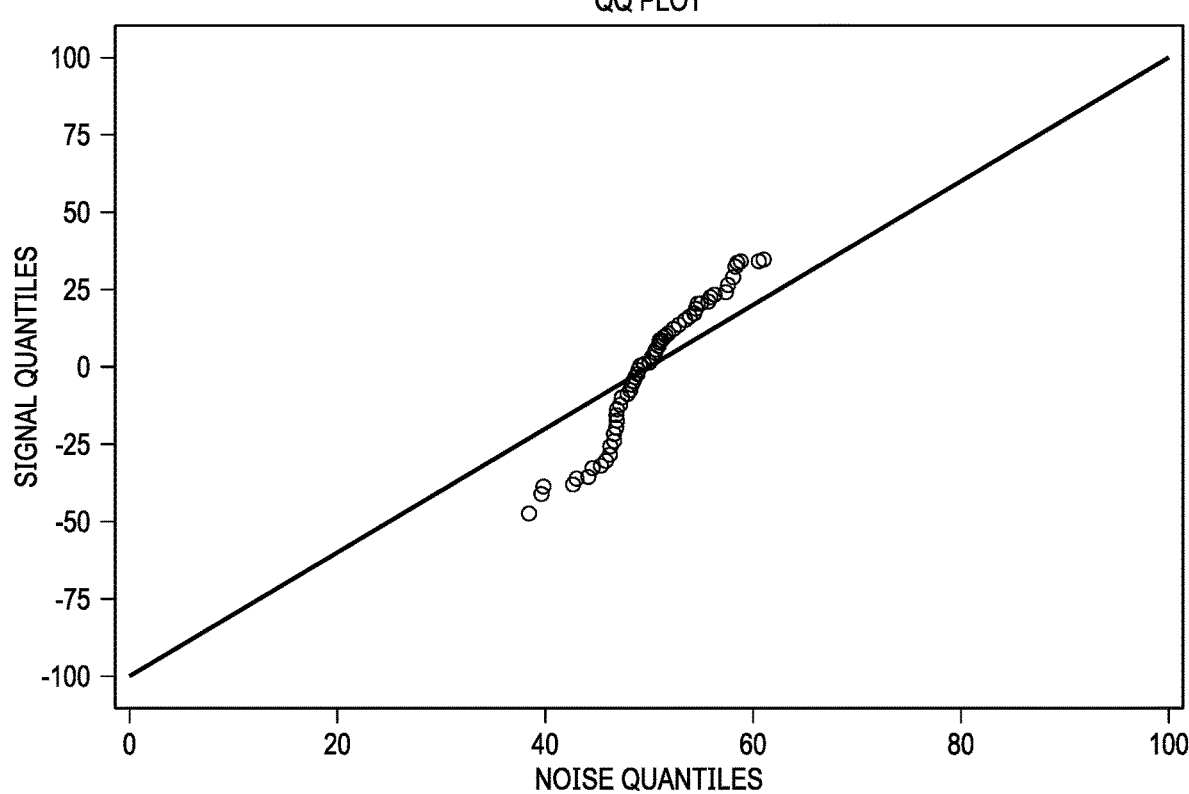
FIG. 29 is an illustration of another example of a quantile-quantile plot in accordance with an illustrative embodiment.

An illustration of an example of a quantile-quantile plot in accordance with an illustrative embodiment is depicted in FIG. 28. In this example, the quantile-quantile plot is for a segment of an audio signal that comprises only noise and no voice activity. An illustration of another example of a quantile-quantile plot in accordance with an illustrative embodiment is depicted in FIG. 29. In this example, the quantile-quantile plot is for a segment of an audio signal that comprises voice activity.

The first method of making the voice activity determination is mean squared error, MSE, analysis (operation 2624). Mean squared error analysis comprises finding the cumulative difference between the points on the calculated curve and the control points. This makes the measure agnostic to whatever the shape may be while still using the difference in the shapes of the curves. Because the mean squared error analysis is agnostic to shape, it does not fail when calculating a net distance.

A second method of making the voice activity determination may be used as an alternative to the mean squared error analysis in operation 2624. The second method of making the voice activity determination leverages the change in slope of the two curves when applying a linear regression to the calculated curve. This method is not dependent on a net distance but instead a direct shape property. Certain shapes may result in the same slope, however, if the curve is symmetric about the control curve. Therefore, the mean squared error analysis method is currently preferred.

Process for voice activity detection 2600 then may proceed with segmentation 2626. In accordance with an illustrative embodiment, segmentation 2626 may include mean squared error wave creation (operation 2628), creating preliminary segment lengths (operation 2630), and segment stitching (operation 2632).

Figure 30:
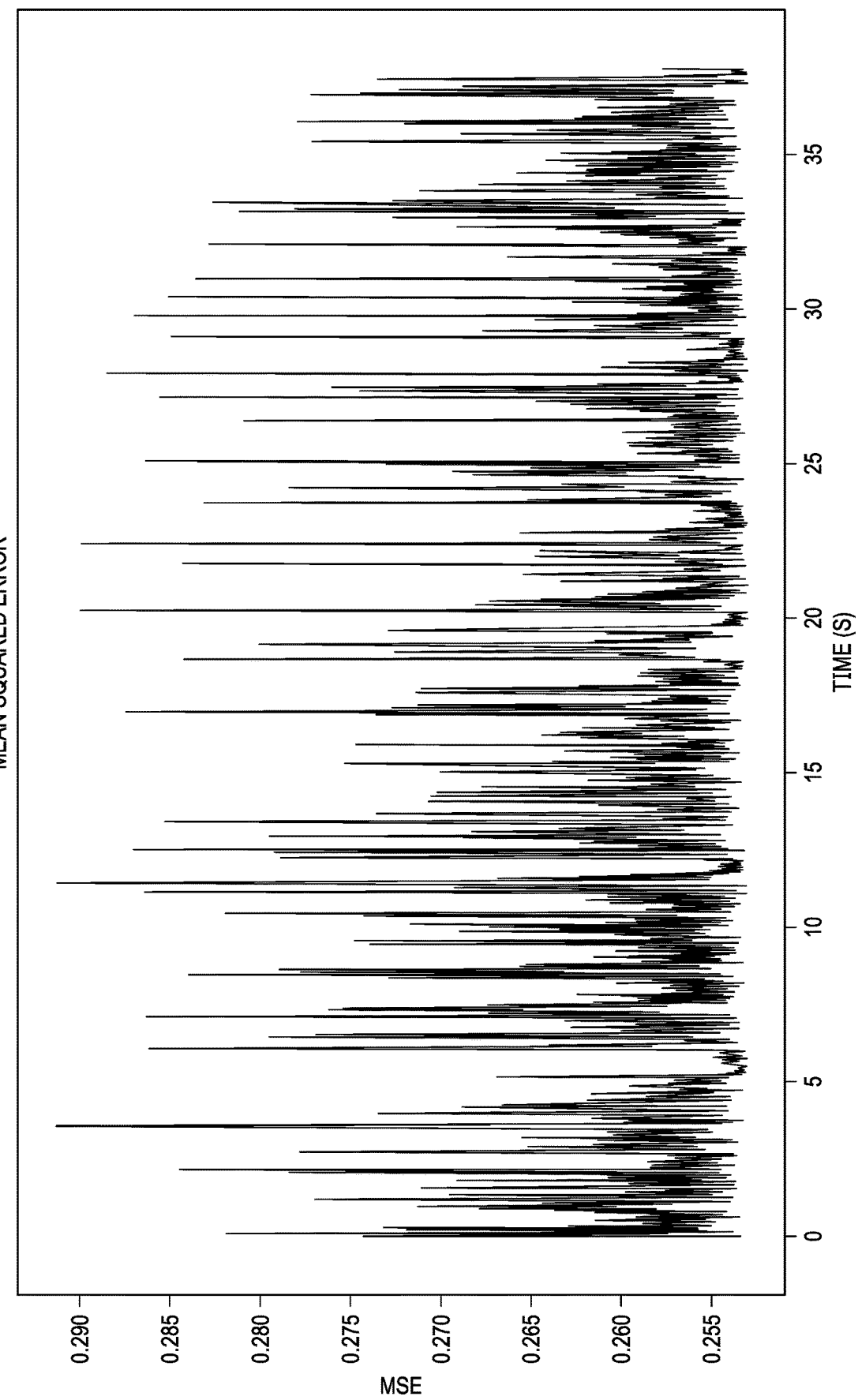
FIG. 30 is an illustration of an example of a mean squared error wave in accordance with an illustrative embodiment.

Mean squared error wave creation (operation 2628) may include determining the mean squared error value for the curve shape at every macro window position. This value is appended to an array for every window position. This creates a mean squared error wave that represents periods of voice activity and periods with no voice activity. This array will continue to grow over time and is used to queue off at which point in time voice activity is detected. An illustration of an example of a mean squared error wave in accordance with an illustrative embodiment is depicted in FIG. 30.

Creating preliminary segment lengths (operation 2630) comprises creating multiple preliminary segment lengths and the time stamps at which they occur based on the mean squared error wave created in operation 2628. This is the first segmentation that occurs.

Segment stitching (operation 2632) comprises checking multiple criteria to ensure that the preliminary segments created in operation 2630 are correct speech and relevant segments of speech. One criteria that may be applied is segment length. For the purpose of training artificial intelligence and machine learning models and crowd sourcing data transcription, segment lengths below and above a defined parameter can be used to exclude things that may not be appropriate for the model. They can also be excluded when not appropriate for the attention span of a transcriber.

To account for gaps of missed conversation by the initial analysis of the voice activity detection, a certain amount of discontinuity is permitted. This is a parameter based on time taken during pauses in a person's speech. If the amount of gaps or discontinuities in detected speech is within the acceptable parameter, the current segment is stitched to the following segment. Gaps greater than this parameter are considered to be not a part of the current segment, from the context of forming a complete sentence or other similar segment.

Figure 31:
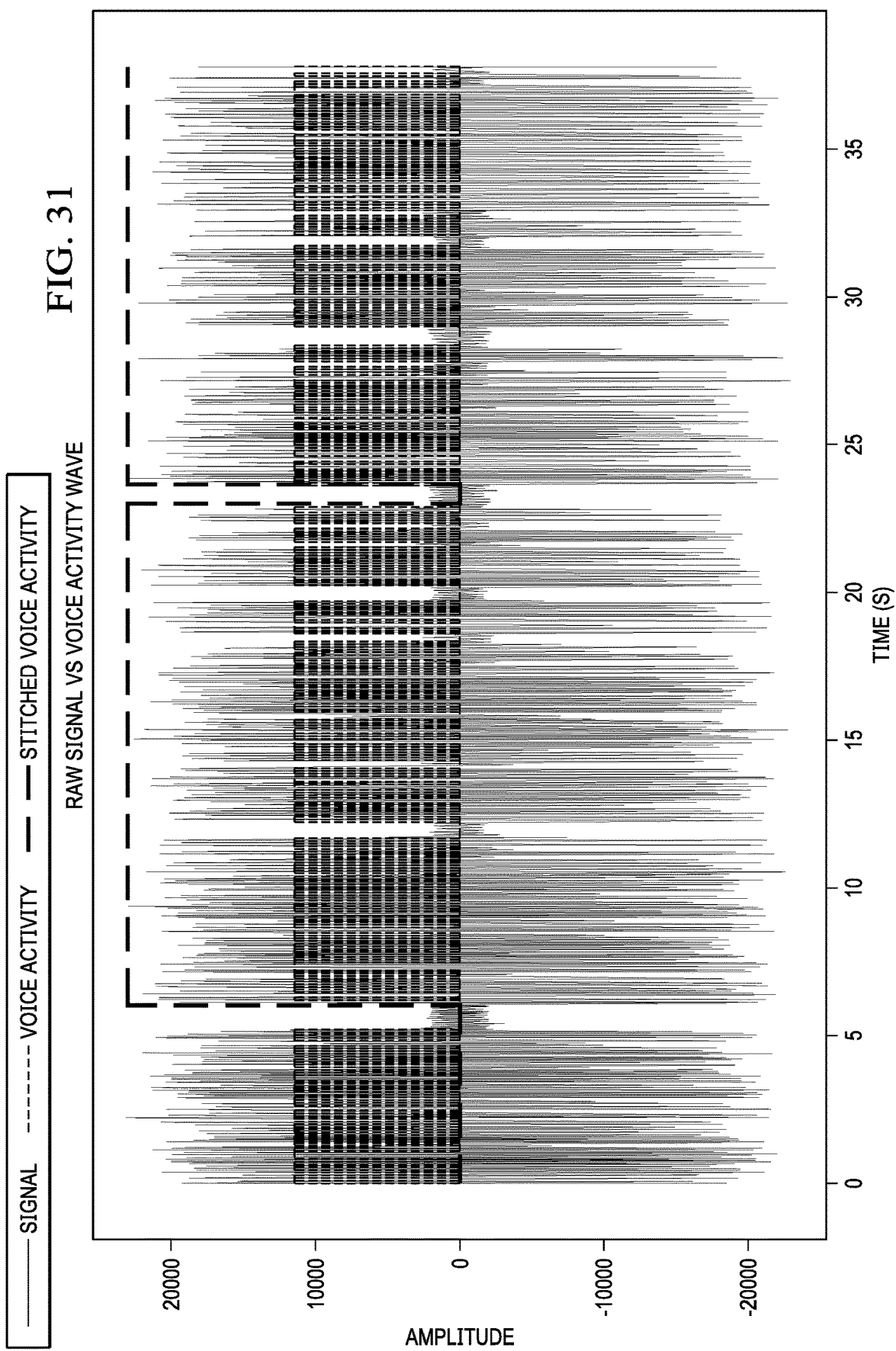
FIG. 31 is an illustration of voice activity detected in an audio signal in accordance with an illustrative embodiment.
Figure 32:
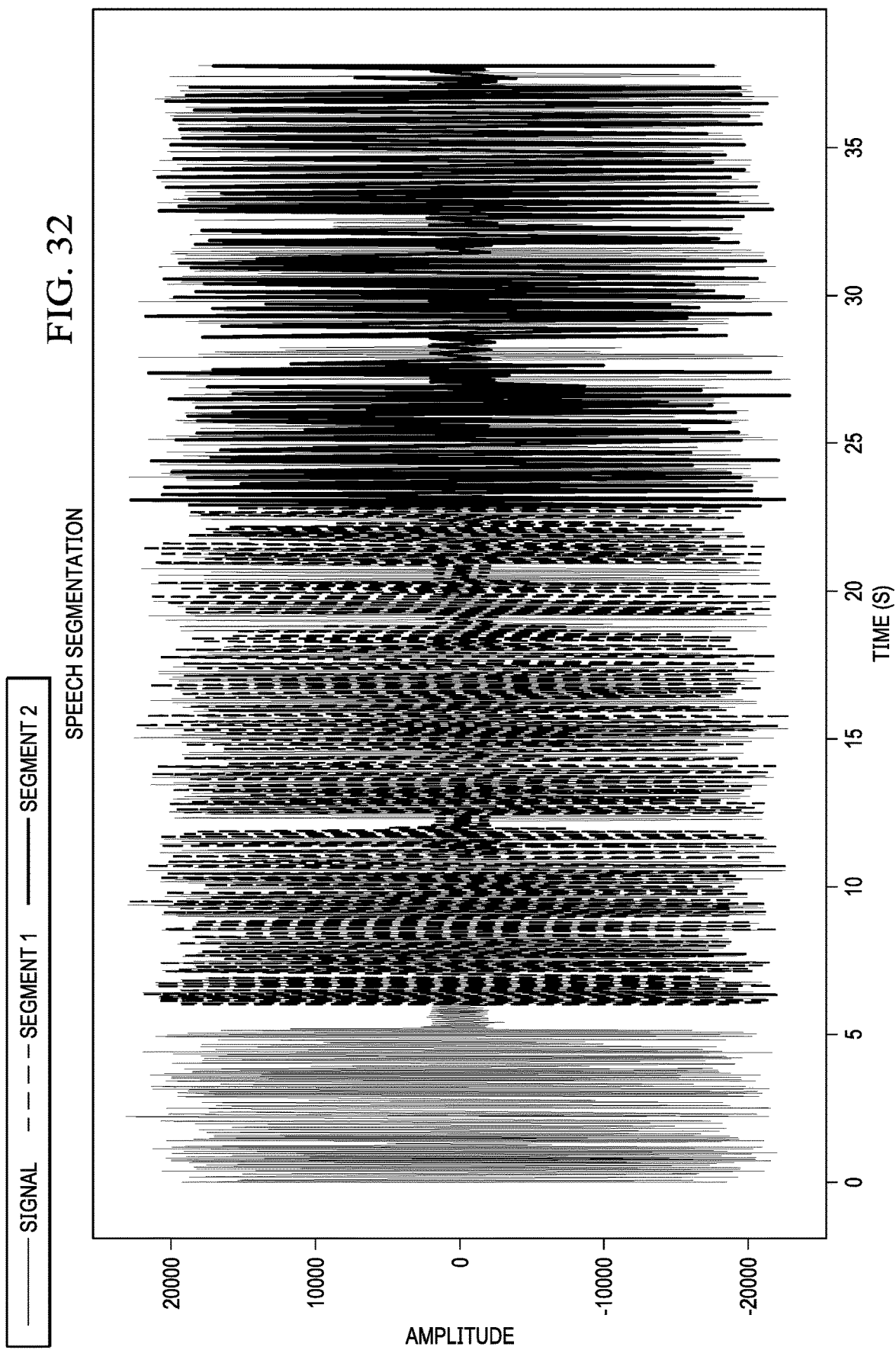
FIG. 32 is an illustration of voice activity segments identified in an audio signal in accordance with an illustrative embodiment.

An illustration of voice activity detected in an audio signal in accordance with an illustrative embodiment is depicted in FIG. 31. An illustration of voice activity segments identified in an audio signal in accordance with an illustrative embodiment is depicted in FIG. 32.

The parameters used in operation 2632 may be tuned depending on the desired end result and mode of operation. For example, without limitation, the parameters used in operation 2632 may be tuned in an appropriate manner depending on whether process for voice activity detection 2600 is being performed on live audio data or on recorded audio files. The criteria checking performed in operation 2632 comprises a final filtering process to create the desired final segments 2634.

Final segments 2634 created by process for voice activity detection 2600 in accordance with an illustrative embodiment may be used in any appropriate manner. For example, without limitation, final segments 2634 may be provided to machine learning artificial intelligence audio model 2636 for transcription. Alternatively, final segments 2634 may be used for training machine learning artificial intelligence audio model.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category. As used herein, the term "substantially" or "approximately" when used with respect to measurements is determined by the ordinary artisan and is within acceptable engineering tolerances in the regulatory scheme for a given jurisdiction, such as but not limited to the Federal Aviation Administration Federal Aviation Regulations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. The steps shown in the flowchart might occur in a different order than the specific sequence of blocks shown.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other desirable examples. The example or examples selected are chosen and described in order to best explain the principles of the examples, the practical application, and to enable others of ordinary skill in the art to understand the disclosure for various examples with various modifications as are suited to the particular use contemplated.

Illustrative embodiments provide a system for speech recognition and transcription, the system comprising: a bus system; a storage device connected to the bus system, wherein the storage device stores program instructions; and a number of processors connected to the bus system, wherein the number of processors execute the program instructions to: select a stored audio file of dialogue; play back the selected audio file through a number of user interfaces; receive a number of user-created transcriptions of the selected audio file through the number of user interfaces; and use the user-created transcriptions as labeled training data for speech recognition machine learning.

The number of processors may further execute instructions to provide an automated speech recognition transcription of the audio file to the number of user interfaces to provide initial speech recognition hints to users, wherein the automated speech transcription is generated according to speech recognition models.

Illustrative embodiments also provide a computer-implemented method of speech recognition and transcription. A stored audio file of dialogue is selected by a number of processors. The selected audio file is played back through a number of user interfaces. A number of user-created transcriptions of the selected audio file are received through the number of user interfaces. The user-created transcriptions are used as labeled training data for speech recognition machine learning.

An automated speech recognition transcription of the audio file may be provided to the number of user interfaces to provide initial speech recognition hints to users, wherein the automated speech transcription is generated according to speech recognition models.

Illustrative embodiments also provide a system for speech recognition and transcription, the system comprising: a bus system; a storage device connected to the bus system, wherein the storage device stores program instructions; and a number of processors connected to the bus system, wherein the number of processors execute the program instructions to: receive audio signals between a pilot and air traffic control regarding flight plan clearance; perform automatic speech recognition on the audio signals according to context dependent models and generating speech and text data from the audio signals; perform flight clearance language-specific natural language processing on the speech and text data; and generate, according to the natural language processing, a visual text display of the audio signals for readback confirmation.

The flight clearance language-specific natural language processing may be performed by a number of processors on-board an aircraft avionics system.

The flight clearance language-specific natural language processing may be performed by a number of processors in a mobile computer.

The flight clearance language-specific natural language processing may be performed by a number of processors comprising a cloud computer environment.

What is claimed is:

1. A method of communicating air traffic control information, the method comprising using a processor unit to perform the steps of:
    receiving, in a receiver, an audio signal comprising voice activity;
    converting the audio signal to a data array;
    amplifying higher frequencies in the data array and forming filtered signals;
    plotting a quantile-quantile statistical distribution of the filtered signals and a target statistical distribution;
    applying one of:
        a mean squared error deviation analysis of a quantile-quantile plot; or
        a linear regression analysis of the quantile-quantile plot;
    segmenting, independent of a power level of a noise in the audio signal, the data array filtered signals into:
        segments comprising the voice activity and
        segments comprising noise activity and lacking the voice activity;
    removing the segments comprising the noise activity and lacking the voice activity from the filtered signals;
    joining together remaining segments of the filtered signals comprising the voice activity;
    identifying, using an artificial intelligence algorithm, the air traffic control information in the voice activity;
    generating a text transcript of the air traffic control information in the voice activity; and
    displaying the text transcript of the air traffic control information on a confirmation display.

2. The method of claim 1 further comprising:
    selecting an audio clip from an audio library;
    playing the audio clip for a user;
    using the artificial intelligence algorithm to generate an initial transcription;
    receiving an updated transcript from the user; and
    using the updated transcript to retrain the artificial intelligence algorithm.

3. The method of claim 1, further comprising the audio signal being of a live signal and detecting the voice activity in the audio signal by:
    tuning the segmenting specifically for the live signal; and
    identifying, using the artificial intelligence algorithm, the air traffic control information in the remaining segments of the filtered signals.

4. A method for detecting voice activity in an audio signal, the method comprising:
- determining a power spectrum of the audio signal;
- converting the audio signal to a data array;
- splitting the data array into frames comprising a size configured for retaining frequency curves after Fourier transform averaging;
- amplifying higher frequencies in the data array and forming filtered signals;
- plotting a statistical distribution of the filtered signals against a target statistical distribution on a quantile-quantile plot;
- applying one of:
  - a mean squared error deviation analysis of the quantile-quantile plot; or
  - a linear regression analysis of the quantile-quantile plot;
- segmenting, independent of a power level of a noise in the audio signal, the filtered signals into:
  - segments comprising voice activity; and
  - segments comprising noise activity and lacking the voice activity;
- removing the segments comprising the noise activity and lacking the voice activity from the filtered signals; and
- joining together remaining segments of the filtered signals comprising the voice activity.

5. The method of claim 4, wherein the audio signal comprises air traffic control radio communications, and further comprising:
- the target statistical distribution being of a random noise;
- the audio signal being a live signal; and
- tuning the segmenting specifically for the live signal.

6. The method of claim 5 further comprising:
- identifying, using an artificial intelligence algorithm, air traffic control information in the remaining segments comprising the voice activity;
- generating a text transcript of the air traffic control information in the remaining segments of the filtered signals; and
- displaying the text transcript of the air traffic control information on a confirmation display.

7. The method of claim 4, wherein the audio signal is selected from a group of audio signals consisting of live audio signals and recorded audio signals.

8. The method of claim 4, wherein determining the power spectrum of the audio signal comprises determining the power spectrum for each of a plurality of analysis windows comprising a time segment of the audio signal.

9. The method of claim 4, further comprising comparing the power spectrum of the audio signal and a power spectrum of a standard Gaussian noise.

10. The method of claim 4, further comprising determining a difference between a shape of a control curve and a curve calculated in the quantile-quantile plot.

11. The method of claim 4, further comprising forming the filtered signals from the data array transiently by only looking at portions of the data array at a time and sliding over a certain step size.

12. The method of claim 4, comparing a slope of a plot of the power spectrum of the audio signal and a slope of a plot of the power spectrum of the target statistical distribution.

13. The method of claim 4, wherein the audio signal is an audio clip selected from an audio library and further comprising:
- playing the audio clip for a user;
- using an artificial intelligence algorithm to generate an initial transcription from the remaining segments of the filtered signals;
- receiving an updated transcript from the user; and
- using the updated transcript to retrain the artificial intelligence algorithm.

14. An apparatus configured to detect a voice activity in an audio signal, wherein the apparatus comprises:
- a receiver configured to receive the audio signal;
- a voice activity detector configured to:
  - convert the audio signal to a data array;
  - amplify higher frequencies in the data array and thereby balance a frequency spectrum of the data array and therefrom generate filtered signals;
  - plot a quantile-quantile plot of a statistical distribution of the filtered signals and a target statistical distribution; and
  - apply one of:
    - a mean squared error deviation analysis of a quantile-quantile plot; or
    - a linear regression analysis of the quantile-quantile plot; and
- a segmenter configured to:
  - segment, independent of a power level of a noise in the audio signal, the filtered signals into:
    - segments that comprise voice activity; and
    - segments that comprise noise activity and lack the voice activity;
  - remove the segments that comprise the noise activity and lack the voice activity from the filtered signals; and \
  - join together remaining segments of the data array that comprise the voice activity to form speech segments.

15. The apparatus of claim 14, wherein the audio signal comprises air traffic control radio communications.

16. The apparatus of claim 14, wherein the audio signal is selected from a group of audio signals that consists of live audio signals and recorded audio signals.

17. The apparatus of claim 14, wherein the voice activity detector is configured to:
- define a plurality of analysis windows in the audio signal, wherein each of the plurality of analysis windows comprises a time segment of the audio signal; and
- determine a power spectrum of each of the plurality of analysis windows in the audio signal.

18. The apparatus of claim 14, further comprising the target statistical distribution being of standard Gaussian noise.

19. The apparatus of claim 14, wherein the voice activity detector is further configured to:
- redefine a time bound of an analysis window configured to determine how much of the data array is analyzed at once.

20. The apparatus of claim 14, wherein the segmenter is configured to form speech segments based upon criteria selected from a group of criteria that consists of segment length and amount of discontinuities in portions of the audio signal that comprise the voice activity.

* * * * *

UNITED STATES PATENT AND TRADEMARK OFFICE
CERTIFICATE OF CORRECTION

PATENT NO. : 11,783,810 B2
APPLICATION NO. : 16/932291
DATED : October 10, 2023
INVENTOR(S) : Stephen Dame et al.

It is certified that error appears in the above-identified patent and that said Letters Patent is hereby corrected as shown below:

In the Claims

Column 22, Line 34, in Claim 14, correct "and \" to read --and--

Signed and Sealed this
Twenty-sixth Day of December, 2023

*Katherine Kelly Vidal*

Katherine Kelly Vidal
*Director of the United States Patent and Trademark Office*